US009868665B2

(12) United States Patent
Machida et al.

(10) Patent No.: US 9,868,665 B2
(45) Date of Patent: Jan. 16, 2018

(54) HEAT RAY-SHIELDING FILM, HEAT RAY-SHIELDING LAMINATED TRANSPARENT BASE MATERIAL, HEAT RAY-SHIELDING RESIN SHEET MATERIAL, AUTOMOBILE AND BUILDING

(71) Applicant: SUMITOMO METAL MINING CO., LTD., Tokyo (JP)

(72) Inventors: Keisuke Machida, Isa (JP); Hiroki Nakayama, Isa (JP); Kenichi Fujita, Isa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 14/782,568

(22) PCT Filed: Apr. 2, 2014

(86) PCT No.: PCT/JP2014/059774
§ 371 (c)(1),
(2) Date: Oct. 5, 2015

(87) PCT Pub. No.: WO2014/163119
PCT Pub. Date: Oct. 9, 2014

(65) Prior Publication Data
US 2016/0060160 A1 Mar. 3, 2016

(30) Foreign Application Priority Data

| Apr. 3, 2013 | (JP) | 2013-077829 |
| Aug. 14, 2013 | (WO) | PCT/JP2013/071907 |
| Mar. 28, 2014 | (JP) | 2014-070175 |
| Mar. 28, 2014 | (JP) | 2014-070176 |

(51) Int. Cl.
| C03C 17/00 | (2006.01) |
| B32B 17/10 | (2006.01) |
| B32B 17/06 | (2006.01) |
| C08J 5/18 | (2006.01) |
| C08K 3/22 | (2006.01) |
| C08K 5/00 | (2006.01) |
| C08K 5/07 | (2006.01) |
| C08K 5/3475 | (2006.01) |

(52) U.S. Cl.
CPC .......... *C03C 17/009* (2013.01); *B32B 17/064* (2013.01); *B32B 17/10633* (2013.01); *B32B 17/10651* (2013.01); *B32B 17/10678* (2013.01); *B32B 17/10688* (2013.01); *B32B 17/10761* (2013.01); *C08J 5/18* (2013.01); *C08K 3/22* (2013.01); *C08K 5/0016* (2013.01); *C08K 5/07* (2013.01); *C08K 5/3475* (2013.01); *B32B 2264/102* (2013.01); *B32B 2419/00* (2013.01); *C03C 2217/74* (2013.01); *C08K 2003/2258* (2013.01)

(58) Field of Classification Search
CPC ........ B32B 17/10651; B32B 17/10688; B32B 17/10633; B32B 17/064; B32B 17/10678; B32B 17/10761; B32B 2264/102; B32B 2419/00; C03C 17/009; C03C 2217/74; C08K 5/3475; C08K 5/0016; C08K 5/07; C08K 3/22; C08K 2003/2258; C08J 5/18
See application file for complete search history.

(56) References Cited

U.S. PATENT DOCUMENTS

| 2009/0035583 A1 | 2/2009 | Fisher | |
| 2010/0220388 A1* | 9/2010 | Suzuki | B32B 17/10 |
| | | | 359/359 |

FOREIGN PATENT DOCUMENTS

| CN | 101784386 A | 7/2010 |
| CN | 101910084 A | 12/2010 |
| JP | S61-277437 A | 12/1986 |
| JP | H02-173060 A | 7/1990 |
| JP | H05-78544 A | 3/1993 |
| JP | H08-160041 A | 6/1996 |
| JP | H08-217500 A | 8/1996 |
| JP | H08-259279 A | 10/1996 |
| JP | H10-297945 A | 11/1998 |
| JP | 2001-089202 A | 4/2001 |
| JP | 2003-327717 A | 11/2003 |
| JP | 2004-037768 A | 2/2004 |
| JP | 2006-219662 A | 8/2006 |
| JP | 2008-545878 A | 12/2008 |
| JP | 2009062411 A | 3/2009 |
| JP | 2010535695 A | 11/2010 |
| JP | 2012041333 A * | 3/2012 |
| WO | 2005/087680 A1 | 9/2005 |
| WO | 2008/149974 A1 | 12/2008 |

(Continued)

OTHER PUBLICATIONS

Kamisaka, Toshiyuki et al., JP 2012041333 "Benzotriazole derivative compound", Mar. 1, 2012 (Machine translation).*

(Continued)

*Primary Examiner* — Cheng Huang
(74) *Attorney, Agent, or Firm* — Oliff PLC

(57) ABSTRACT

A heat ray-shielding film has excellent heat-shielding performance and a color tone, and exhibits weather resistance. A heat ray-shielding laminated transparent base material and a heat ray-shielding resin sheet material use the heat ray-shielding film. The heat ray-shielding film and the heat ray-shielding resin sheet material are expressed by a general formula $M_yWO_z$, and contain a composite tungsten oxide particle having a hexagonal crystal structure, selected wavelength absorbing material, and thermoplastic resin. The selected wavelength absorbing material has a transmission profile in which a transmittance of a light of a wavelength of 420 nm can be set to 40% or less when a transmittance of a light of a wavelength of 550 nm is 90% or more, and a transmittance of a light of a wavelength of 460 nm is 90% or more.

11 Claims, No Drawings

(56) References Cited

FOREIGN PATENT DOCUMENTS

| WO | 2009/093655 A1 | 7/2009 |
| WO | 2012/108537 A  | 8/2012 |
| WO | 2012/115197 A1 | 8/2012 |
| WO | 2013/080859 A1 | 6/2013 |

OTHER PUBLICATIONS

Jun. 24, 2014 International Search Report issued in International Patent Application No. PCT/JP2014/059774.

* cited by examiner

HEAT RAY-SHIELDING FILM, HEAT RAY-SHIELDING LAMINATED TRANSPARENT BASE MATERIAL, HEAT RAY-SHIELDING RESIN SHEET MATERIAL, AUTOMOBILE AND BUILDING

TECHNICAL FIELD

The present invention relates to a heat ray-shielding film exhibiting an excellent heat-shielding characteristic, color tone, and weather resistance, a heat ray-shielding transparent base material and a heat ray-shielding resin sheet material using the heat ray-shielding film, an automobile having the heat ray-shielding laminated transparent base material and the heat ray-shielding resin sheet material mounted thereon as a window material, and a building in which the heat ray-shielding laminated transparent base material and the heat ray-shielding resin sheet material are used as window materials.

DESCRIPTION OF RELATED ART

A so-called opening part such as a window of each kind of building and vehicle, is made of a transparent glass material or a resin plate, etc., for capturing a solar light. However, the solar light includes a UV-ray and an infrared ray other than a visible ray, and particularly the near infrared ray with a wavelength of 800 to 2500 nm is called a heat ray, and is a factor of raising a temperature in a room, etc., by entering thereinto from an opening part.

Therefore, in recent years, as the window materials of each kind of building or automobiles, a heat ray-shielding material has been examined, and each kind of method is proposed, which is capable of shielding a heat ray while sufficiently capturing a visible light, and suppressing a temperature rise in a room, etc., while maintaining brightness.

Then, as a safety glass used for the window material of the automobiles or the building, a transparent base material is used, which constitutes a laminated glass, with an intermediate layer containing thermoplastic resin such as polyvinyl acetal resin and ethylene-vinyl acetate copolymer interposed between opposing plurality of (for example, two) plate glasses. Further, there is proposed a transparent base material which is provided for the purpose of shielding an incident solar energy by imparting a heat ray-shielding function to the intermediate layer, and reducing a cooling load and a human hot feeling.

For example, patent document 1 discloses a laminated glass, with a soft resin layer containing heat ray shielding metal oxide composed of tin oxide or indium oxide having a fine particle size of 0.1 μm or less, between two opposing plate glasses.

Also, patent document 2 discloses a laminated glass with an intermediate layer interposed between at least two opposing plate glasses, the intermediate layer being formed in a dispersion state of metal such as Sn, Ti, Si, Zn, Zr, Fe, Al, Cr, Co, Ce, In, Ni, Ag, Cu, Pt, Mn, Ta, W, V, and Mo, oxide of this metal, nitride of this metal, sulfide of this metal, and the metal doped with Sb or F, and further a composite of them.

Further, patent document 3 discloses a window glass for automobiles, with fine particles such as $TiO_2$, $ZrO_2$, $SnO_2$, and $In_2O_3$, and a glass component made of organic silicon or an organic silicon compound, interposed between opposing transparent plate-like members.

Further, patent document 4 discloses a laminated glass, with a three-layer intermediate layer interposed between at least two opposing transparent plate-like bodies, wherein a second layer of the intermediate layer is formed in a dispersion state of metal such as Sn, Ti, Si, Zn, Zr, Fe, Al, Cr, Co, Ce, In, Ni, Ag, Cu, Pt, Mn, Ta, W, V, and Mo, oxide of this metal, nitride of this metal, sulfide of this metal, and the metal doped with Sb or F, and further a composite of them, and a first layer and a third layer of the intermediate layer is formed as resin layers.

However, there is a problem that conventional laminated glasses disclosed in patent documents 1 to 4, don't have a sufficient heat-ray shielding function when a high visible light transmittance is required.

Further, as a method of improving the heat ray-shielding function of the laminated glass, patent document 5 discloses a ultraviolet and infrared ray-shielding body formed by molding a metal oxide semiconductor and a near-infrared absorber and a ultraviolet absorber mixed into a transparent synthetic resin on a film.

On the other hand, an applicant also discloses in patent document 6, a heat ray-shielding laminated glass, with an intermediate layer having a heat ray-shielding function interposed between two plate glasses, the intermediate layer being composed of a heat ray-shielding film containing hexaboride particles alone, or hexaboride particles and ITO particles and/or ATO particles, and vinyl resin, or the intermediate layer being composed of a heat ray-shielding film containing the abovementioned particles formed on a surface facing an inside of at least one of the plate glasses, and a film containing vinyl resin interposed between the abovementioned two plate glasses.

As described in patent document 6, an optical performance of the heat ray-shielding laminated glass using the hexaboride particles alone or the hexaboride particles and ITO particles and/or ATO particles, is that there is a maximum point of transmission in a visible light region, and there is a minimum point of transmittance in a near infrared region, with a strong absorption exhibited there. As a result, a solar transmittance of this heat ray-shielding laminated glass is improved to 50% mark when the visible light transmittance is 70% or more, compared to the conventional laminated glass described in patent documents 1 to 4.

Inventors of the present invention also disclose in patent document 7, a heat ray-shielding laminated glass, with the heat ray-shielding film containing a composite tungsten compound in polyvinyl acetal resin, as an intermediate layer.

As described in patent document 7, the solar transmittance of this heat ray-shielding laminated glass is improved to around 35% when the visible light transmittance is 70% or more, compared to the conventional laminated glass described in patent documents 1 to 4 and patent document 6.

The inventors of the present invention also disclose in patent document 8 a heat ray-shielding laminated transparent base material, with a heat ray-shielding film interposed between two transparent base materials, the heat ray-shielding film containing composite tungsten oxide and a selected wavelength absorbing material in polyvinyl butyral resin, the selected wavelength absorbing material having a transmission profile of 90% or more transmittance of a light of a wavelength 550 nm, and 40% or less transmittance of a light of a wavelength of 450 nm.

As described in patent document 8, the solar transmittance of this heat ray-shielding laminated glass is improved to 32.5% or less when the visible light transmittance is 70% or more, compared to the conventional laminated glass described in patent document 7.

Further, for example, patent document 9 discloses a heat ray-shielding plate, with a heat ray-reflective film adhered to a transparent base material such as a glass plate, an acrylic plate, and a polycarbonate plate, etc., the heat ray-shielding film being formed by depositing metal on a transparent resin film.

Other than a method of applying a heat ray reflection film and a heat ray-shielding resin sheet material on the abovementioned transparent base material, for example patent document 10 and patent document 11 disclose a heat ray-shielding plate formed by kneading mica coated with titanium oxide as a heat ray reflecting particle, into transparent resin such as acrylic resin and polycarbonate resin, etc.

On the other hand, patent document 12 focuses on hexaboride fine particles having a large amount of free electrons as a component having a heat ray-shielding effect, and discloses a heat ray-shielding resin sheet material, with hexaboride fine particles, or hexaboride fine particles and ITO particles and/or ATO particles dispersed in polycarbonate resin or acrylic resin, wherein as the optical performance of the heat ray-shielding resin sheet material using the hexaboride fine particles alone or the hexaboride fine particles and the ITO fine particles and/or ATO fine particles, there is a maximum point of transmittance of a visible light in a visible light region, and there is a minimum point of transmittance in a near infrared region, with a strong absorption exhibited there, and therefore the solar transmittance is reduced to 50% mark when the visible light transmittance is 70% or more.

Further, in patent document 13, the solar transmittance of the heat ray-shielding resin sheet material with composite tungsten oxide particles contained in a transparent resin base material, is improved to around 35% when the visible light transmittance is 70% or more, compared to the conventional heat ray-shielding resin sheet material described in patent documents 9 to 12.

PRIOR ART DOCUMENT

Patent Document

Patent document 1: Japanese Patent Laid Open Publication No. 1996-217500
Patent document 2: Japanese Patent Laid Open Publication No. 1996-259279
Patent document 3: Japanese Patent Laid Open Publication No. 1992-160041
Patent document 4: Japanese Patent Laid Open Publication No. 1998-297945
Patent document 5: Japanese Patent Laid Open Publication No. 2004-37768
Patent document 6: Japanese Patent Laid Open Publication No. 2001-89202
Patent document 7: WO2005/087680
Patent document 8: WO2013/080859
Patent document 9: Japanese Patent Laid Open Publication No. 1986-277437
Patent document 10: Japanese Patent Laid Open Publication No. 1993-78544
Patent document 11: Japanese Patent Laid Open Publication No. 1990-173060
Patent document 12: Japanese Patent Laid Open Publication No. 2003-327717
Patent document 13: Japanese Patent Laid Open Publication No. 2006-219662

SUMMARY OF THE INVENTION

Problem to be Solved by the Invention

However, as a result of a further examination by the inventors of the present invention, the following problem is found. Namely, the laminated glass of the conventional technique described in patent documents 1 to 5, does not have a sufficient heat ray-shielding function when high visible light transmittance is requested.

Further, there is a high request for a further high performance of a shielding function from a viewpoint of improving comfortability in automobiles and buildings, or improving fuel efficiency by reducing a load of an air conditioner in the automobiles, and reducing a load of an air conditioner in the buildings. From this viewpoint, there is a further room for improvement in the heat ray-shielding laminated glass described in patent documents 6 and 7.

Although the abovementioned problem can be solved by the heat ray-shielding laminated glass described in patent document 8, there is a problem that color of the heat ray-shielding film is changed by absorption of the visible light, thus exhibiting a strong yellowish color tone, by the selected wavelength absorbing material for absorbing a visible light.

Meanwhile, the heat ray-shielding resin sheet material described in patent document 9, has a defect of not only an extremely high cost of a heat reflection film itself, but also an extremely high cost because a complicated step such as an adhesion step, etc., is required. This heat ray-shielding resin sheet material also has a defect that a heat ray-reflection film is peeled-off by a change over time, due to a poor adhesion between the transparent base material and the heat ray reflection film.

A large quantity of heat ray reflection particles are required to be added to the heat ray-shielding plate described in patent documents 10 and 11, for increasing a heat-shielding performance. However, there is a problem that a visible light transmittance is decreased by increasing an addition amount of the heat ray reflection particles. Reversely, if the addition amount of the heat ray reflection particles is reduced, a heat-shielding performance is reduced although the visible light transmittance is increased, and therefore the heat-shielding performance and the visible light transmittance cannot be simultaneously satisfied. There is also a problem that if the large quantity of the heat ray reflection particles is mixed, there is a defect in terms of a strength, such as a deterioration of physical properties of a transparent resin which is a base material, particularly a reduction of an impact resistance or toughness.

On the other hand, there is a high request for a further high performance of a shielding function from a viewpoint of an energy saving by improving comfortability in automobiles and buildings, or improving fuel efficiency by reducing a load of an air conditioner in the automobiles, and reducing a load of an air conditioner in the buildings. From this viewpoint, there is a further room for improvement in the heat ray-shielding laminated glass described in patent documents 12 and 13.

The present invention is provided by focusing on the abovementioned problem, and an object of the present invention is to provide a heat ray-shielding resin sheet material capable of exhibiting an excellent heat-shielding performance while using a thermoplastic resin, an automobile on which the heat ray-shielding resin sheet material is mounted as a window material, and a building in which the heat ray-shielding resin sheet material is used as a window material.

The present invention is provided by focusing on the abovementioned problem. Then, using a publicly-known thermoplastic resin such as polyvinyl acetal resin, etc., as a main component, the problem to be solved is to provide a heat ray-shielding film capable of exhibiting an excellent heat-shielding performance, color tone, and weather resistance, a heat ray-shielding laminated transparent base material using the heat ray-shielding film, an automobile on which the heat ray-shielding laminated transparent base material is used as a window material, and a building in which the heat ray-shielding laminated transparent base material is used as a window.

Means for Solving the Problem

In order to solve the abovementioned problem, inventors of the present invention make strenuous efforts for a method of improving a heat-shielding performance, while maintaining a high visible light transmittance.

The inventors of the present invention focuses on a wavelength distribution of a weight value factor used for calculating the visible light transmittance described in JIS R 3106. Specifically, the wavelength distribution of the weight value factor used for calculating the visible light transmittance, and a solar energy in a short wavelength region are examined in detail. Then, the following knowledge is obtained: only the solar transmittance can be reduced while maintaining a high visible light transmittance, by suitably shielding the short wavelength region of a visible light.

Owing to this knowledge, it is found by the inventors of the present invention, that the abovementioned object can be achieved by providing a coexisting state of a composite tungsten oxide having a strong near infrared absorption ability, and a selected wavelength absorbing material capable of efficiently absorbing a light in a region which cannot be sufficiently absorbed by the composite tungsten oxide.

Specifically, regardless of a common sense of using the near-infrared absorber which does not cut the visible light region as much as possible, as described in the conventional technique, a coexisting state of the selected wavelength absorbing material and the composite tungsten oxide particles can be provided to prevent a reduction of the visible light transmittance as much as possible, the selected wavelength absorbing material not having an absorption in the vicinity of the wavelength 550 nm which is a region that greatly contributes to calculating a visible light transmittance, while strongly absorbing a UV light of a wavelength of 300 nm to 380 nm, and a visible light of a wavelength of 380 nm to 480 nm.

However, by coexisting with the selected wavelength absorbing material that absorbs the visible light, it is predicted that the color of the heat ray-shielding film is changed. Therefore, next, various examination has been attempted by the inventors of the present invention, using a color value calculated based on JIS Z 8701 from a spectral transmittance measurement of the heat ray-shielding film, with yellowness index of plastic (described as "YI" in some cases in the present invention) calculated based on JIS K 7373, as an index. As a result, as a new concept, the coexistence state of the selected wavelength absorbing material and the composite tungsten oxide particles is achieved, the selected wavelength absorbing material not having absorption in the vicinity of the wavelength 550 nm which is a region that greatly contributes to calculating the visible light transmittance, and not having absorption in the vicinity of the wavelength of 460 nm that has a great influence on the heat-ray shielding film and the heat ray-shielding laminated transparent base material Y1, and having a great absorption in the vicinity of the wavelength 420 nm.

The selected wavelength absorbing material and the composite tungsten oxide are allowed to coexist, the selected wavelength absorbing material not having absorption in the vicinity of the wavelength 550 nm, and not having absorption in the vicinity of the wavelength 460 nm, and having a great absorption in the vicinity of the wavelength 420 nm. As a result, the solar transmittance can be lower than the solar transmittance in a case of not allowing the selected wavelength absorbing material to coexist, while maintaining the visible light transmittance. Namely, it is found that the heat-shielding performance can be improved, and the color tone capable of normally identifying the color of a transmitted image can be maintained. Thus, the present invention is completed.

Above all, it is found that when the selected wavelength absorbing material is an indole compound and/or a benzotriazole compound, and further preferably an indole compound, and a benzotriazole compound and/or a benzotriazole derivative compound having a specific chemical formula, the heat-shielding performance can be remarkably improved.

In addition, it is also found that when the selected wavelength absorbing material is a benzotriazole compound, and further preferably a benzotriazole compound, and a benzotriazole derivative compound having a specific chemical formula, there is little variation of the color tone and the visible light transmittance in a case of a long time used of the heat ray-shielding film, and the weather resistance is excellent.

Namely, in order to solve the abovementioned problem, a 1st invention is a heat ray-shielding film, and containing a composite tungsten oxide particle having a hexagonal crystal structure, a selected wavelength absorbing material, and a thermoplastic resin, wherein the composite tungsten oxide is expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$), wherein the selected wavelength absorbing material has a transmission profile in which a transmittance of a light of a wavelength of 420 nm can be set to 40% or less when a transmittance of a light of a wavelength of 550 nm is 90% or more, and a transmittance of a light of a wavelength of 460 nm is 90% or more.

A 2nd invention is the heat ray-shielding film, wherein the selected wavelength absorbing material is one or more kinds selected from a benzotriazole compound, a benzotriazole derivative, a benzophenone compound, a triazine compound, the indole compound, an azomethine compound, a benzotrizsolyl compound, and a benzoyl compound.

A 3rd invention is a heat ray-shielding film, wherein the selected wavelength absorbing material is the benzotriazol compound expressed by [Chemical formula 1], and R1 in the benzotriazol compound expressed by [Chemical formula 1] is selected from a hydrogen atom, a halogen atom, an alkyl group, an alkoxy group, a hydroxyl group, an amino group, straight or branched chain mono-substituted amino group, straight or branched chain di-substituted amino group, a nitro group, a carboxyl group, an alkylcarbonyloxy alkyl group in which carbon atoms in an alkyl group are each 1 to 8, an alkyloxycarbonyl alkyl group in which the sum of the carbon atoms in the alkyl group is 2 to 10, an aryl group, an acyl group, a sulfo group, a cyano group, a group expressed by [Chemical formula 2], a group expressed by [Chemical formula 3], a group expressed by [Chemical formula 4], and a group expressed by [Chemical formula 5], wherein R2 in the group expressed by [Chemical formula 2] to [Chemical formula 5] is an alkylene group having 1 to 8 carbon atoms, and R3 in the group expressed by [Chemical formula 2] to [Chemical formula 5] is the hydrogen atom or a methyl group, and R4 in the group expressed by [Chemical formula 4] is the alkylene group having 1 to 8 carbon atoms.

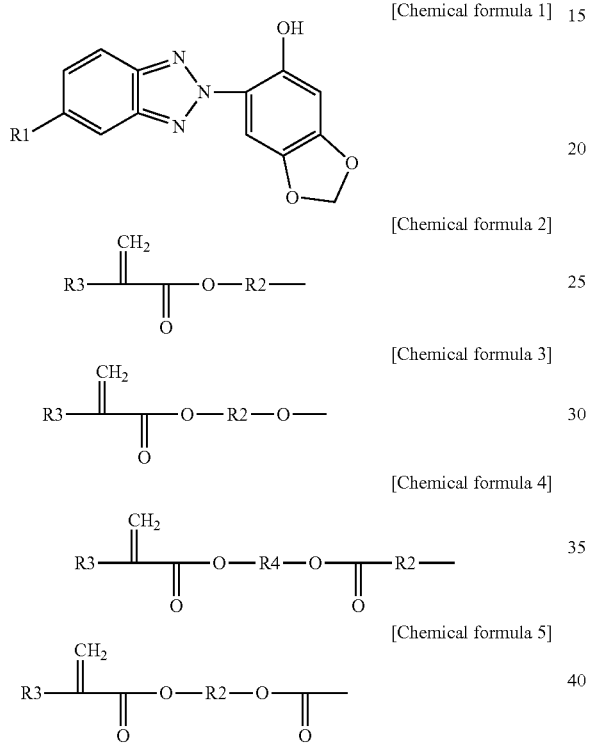

[Chemical formula 1]

[Chemical formula 2]

[Chemical formula 3]

[Chemical formula 4]

[Chemical formula 5]

A 4th invention is the heat ray-shielding film, wherein the selected wavelength absorbing material is one or more kinds selected from the benzotriazol compound expressed by any one of [Chemical formula 6] to [Chemical formula 10].

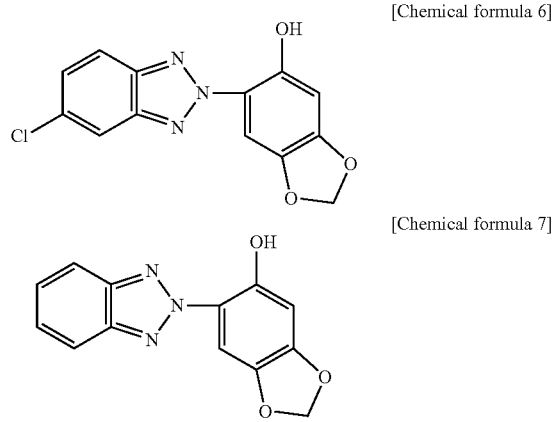

[Chemical formula 6]

[Chemical formula 7]

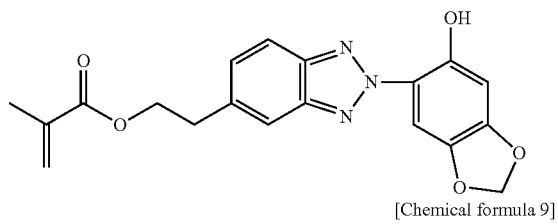

[Chemical formula 8]

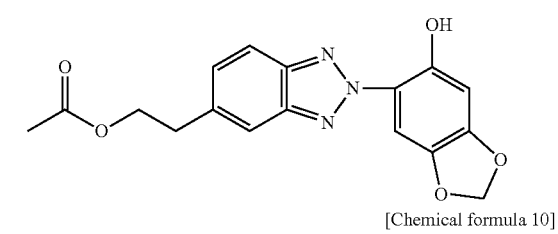

[Chemical formula 9]

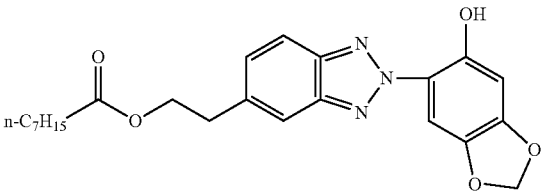

[Chemical formula 10]

A 5th invention is the heat ray-shielding film, wherein the selected wavelength absorbing material is the indole compound expressed by [Chemical formula 11], wherein R in the indole compound expressed by [Chemical formula 11] is the alkyl group having 1 to 10 carbon atoms or the aralkyl group having 7 to 10 carbon atoms.

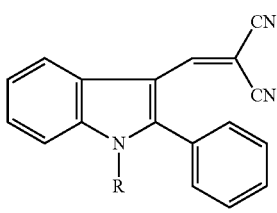

[Chemical formula 11]

A 6th invention is the heat ray-shielding film, wherein the selected wavelength absorbing material is the indole compound expressed by [Chemical formula 12].

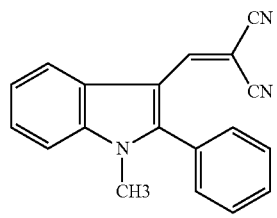

[Chemical formula 12]

A 7th invention is the heat ray-shielding film, wherein a content of the selected wavelength absorbing material in the heat ray-shielding film is 0.01 mass % or more and 2.0 mass % or less.

An 8th invention is the heat ray-shielding film, wherein the thermoplastic resin is one kind of resin selected from the resin group consisting of polyvinyl acetal resin, vinyl chloride resin, ethylene-vinyl acetate copolymer, or a mixture of two or more kinds of resins selected from the above resin group, or a copolymer of two or more kinds of resins selected from the above resin group.

A 9th invention is the heat ray-shielding film, wherein the thermoplastic resin is polyvinyl butyral resin, and further contains a plasticizer.

A 10th invention is the heat ray-shielding film, wherein the composite tungsten oxide particle is at least one kind selected from $Cs_{0.33}WO_3$ and $Rb_{0.33}WO_3$.

An 11th invention is the heat ray-shielding film, wherein the composite tungsten oxide particle is a particle having a dispersed particle size of 40 nm or less.

A 12th invention is the heat ray-shielding film, wherein the heat ray-shielding film further contains a ultraviolet absorber.

A 13th invention is the heat ray-shielding film, wherein the ultraviolet absorber is one or more kinds selected from a benzotriazol compound and a benzophenon compound.

A 14th invention is the heat ray-shielding film, wherein the content of the ultraviolet absorber in the heat ray-shielding film is 0.02 mass % or more and 5.0 mass % or less.

A 15th invention is the heat ray-shielding film, wherein the heat ray-shielding film further contains polyvalent metal salt.

A 16th invention is the heat ray-shielding film, wherein the polyvalent metal salt is bis(2-ethyl butyrate) magnesium.

A 17th invention is a heat ray-shielding resin sheet material, containing a composite tungsten oxide particle expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \le y \le 0.5$, $2.2 \le z \le 3.0$) and having a hexagonal crystal structure, a selected wavelength absorbing material, and a thermoplastic resin, wherein the selected wavelength absorbing material has a transmission profile in which a transmittance of a light of a wavelength of 420 nm can be set to 40% or less when a transmittance of a light of a wavelength of 550 nm is 90% or more, and a transmittance of a light of a wavelength of 460 nm is 90% or more.

An 18th invention is the heat ray-shielding resin sheet material, wherein the selected wavelength absorbing material is one or more kinds selected from a benzotriazole compound, a benzotriazole derivative, a benzophenone compound, a triazine compound, an indole compound, an azomethine compound, a benzotriazolyl compound, and a benzoyl compound.

A 19th invention is the heat ray-shielding resin sheet material, wherein the selected wavelength absorbing material is the benzotriazol compound expressed by [Chemical formula 1], and R1 in the benzotriazol compound expressed by [Chemical formula 1] is selected from a hydrogen atom, a halogen atom, an alkyl group, an alkoxy group, a hydroxyl group, an amino group, straight or branched chain mono-substituted amino group, straight or branched chain di-substituted amino group, a nitro group, a carboxyl group, an alkylcarbonyloxy alkyl group in which carbon atoms in an alkyl group are each 1 to 8, the alkyloxycarbonyl alkyl group in which the sum of the carbon atoms in the alkyl group is 2 to 10, an aryl group, an acyl group, a sulfo group, a cyano group, a group expressed by [Chemical formula 2], a group expressed by [Chemical formula 3], a group expressed by [Chemical formula 4], and a group expressed by [Chemical formula 5], wherein R2 in the group expressed by [Chemical formula 2] to [Chemical formula 5] is an alkylene group having 1 to 8 carbon atoms, and R3 in the group expressed by [Chemical formula 2] to [Chemical formula 5] is the hydrogen atom or a methyl group, and R4 in the group expressed by [Chemical formula 4] is the alkylene group having 1 to 8 carbon atoms.

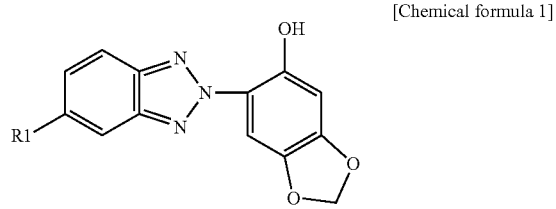

[Chemical formula 1]

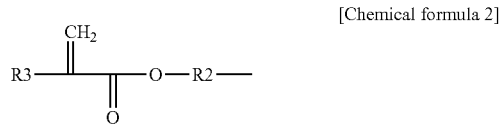

[Chemical formula 2]

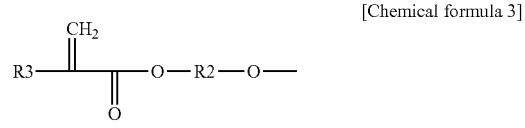

[Chemical formula 3]

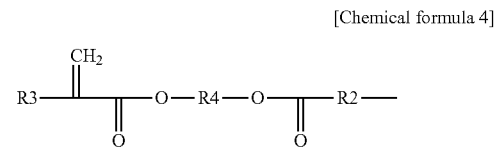

[Chemical formula 4]

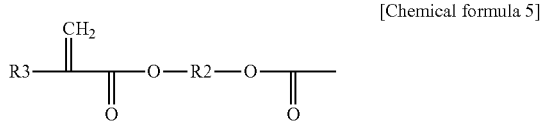

[Chemical formula 5]

A 20th invention is the heat ray-shielding resin sheet material, wherein the selected wavelength absorbing material is one or more kinds selected from the benzotriazole compound expressed by any one of [Chemical formula 6] to [Chemical formula 10].

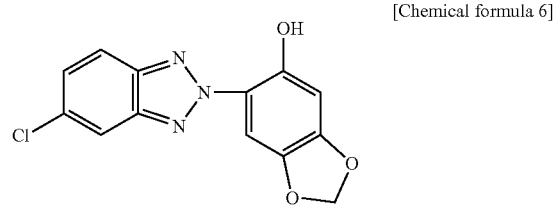

[Chemical formula 6]

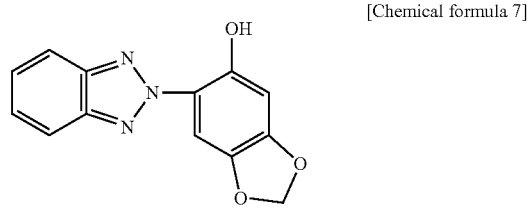

[Chemical formula 7]

-continued

[Chemical formula 8]

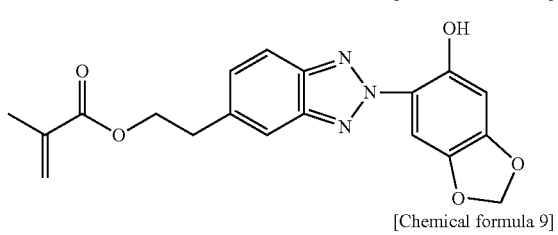

[Chemical formula 9]

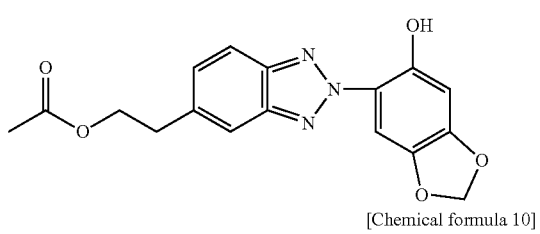

[Chemical formula 10]

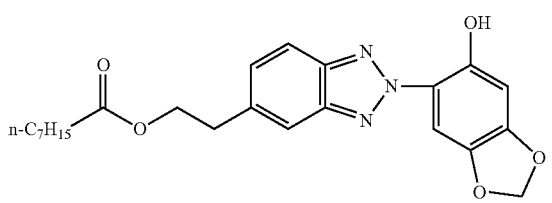

A 21th invention is the heat ray-shielding resin sheet material, wherein the selected wavelength absorbing material is the indole compound expressed by [Chemical formula 11], and R in the indole compound expressed by [Chemical formula 11] is the alkyl group having 1 to 10 carbon atoms or the aralkyl group having 7 to 10 carbon atoms.

[Chemical formula 11]

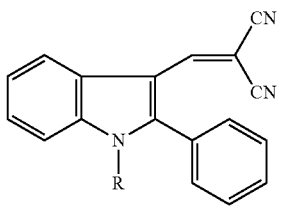

A 22th invention is the heat-ray shielding resin sheet material, wherein the selected wavelength absorbing material is the indole compound expressed by [Chemical formula 12].

[Chemical formula 12]

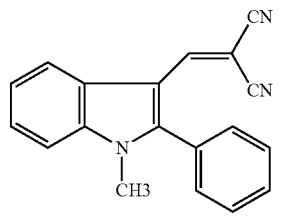

A 23th invention is the heat ray-shielding resin sheet material, wherein a content of the selected wavelength absorbing material in the heat ray-shielding resin sheet material is 0.01 mass % or more and 2.0 mass % or less.

A 24th invention is the heat ray-shielding resin sheet material, wherein the thermoplastic resin is one kind of resin selected from the resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorocarbon resin, and ethylene-vinyl acetate copolymer, or a mixture of two or more kinds of resins selected from the resin group, or a copolymer of two or more kinds of resins selected from the resin group.

A 25th invention is the heat ray-shielding resin sheet material, wherein the composite tungsten oxide particle is at least one kind selected from $Cs_{0.33}WO_3$ and $Rb_{0.33}WO_3$.

A 26th invention is the heat ray-shielding resin sheet material, wherein the composite tungsten oxide particle is a particle having a dispersed particle size of 40 nm or less.

A 27th invention is the heat ray-shielding resin sheet material, wherein the heat ray-shielding resin sheet material further contains an ultraviolet absorber.

A 28th invention is the heat ray-shielding resin sheet material, wherein the ultraviolet absorber is one or more kinds selected from a benzotriazole compound and a benzophenon compound.

A 29th invention is the heat ray-shielding resin sheet material, wherein a content of the ultraviolet absorber in the heat ray-shielding resin sheet material is 0.02 mass % or more and 5.0 mass % or less.

A 30th invention is the heat ray-shielding resin sheet material, wherein the heat ray-shielding resin sheet material further contains an infrared absorbing organic compound.

A 31th invention is the heat ray-shielding resin sheet material, wherein the infrared absorbing organic compound is one or more kinds selected from a phthalocyanine compound, a naphthalocyanine compound, an imonium compound, a diimonium compound, a polymethine compound, a diphenylmethane compound, a triphenylmethane compound, a quinone compound, an azo compound, a pentadiene compound, an azomethine compound, a squarylium compound, an organometallic complexe, and a cyanine compound.

A 32th invention is the heat ray-shielding resin sheet material, wherein the infrared absorbing organic compound is at least one kind selected from a phthalocyanine compound and a diimonium compound.

A 33th invention is the heat ray-shielding resin sheet material, wherein a content of the infrared ray absorbing organic compound is 0.02 mass % or more and 0.2 mass % or less.

A 34th invention is the heat ray-shielding resin sheet material, wherein yellowness index (YI) calculated based on JIS K 7373 is −20.00 or more and 10.0 or less.

A 35th invention is the heat ray-shielding resin sheet material, wherein yellowness index (YI) calculated based on JIS K 7373 is −20.00 or more and 5.0 or less.

A 36th invention is the heat ray-shielding resin sheet material, wherein a visible light transmittance calculated based on JIS R 3106 is 70% or more and a solar transmittance is 32.5% or less.

A 37th invention is a heat ray shielding laminated transparent base material, wherein the heat ray-shielding film of the present invention is interposed between a plurality of transparent base materials.

A 38th invention is the heat ray-shielding laminated transparent base material, wherein yellowness index (YI) calculated based on JIS K 7373 is −20.00 or more and 10.0 or less.

A 39th invention is the heat ray-shielding laminated transparent base material, wherein yellowness index (YI) calculated based on JIS K 7373 is −20.00 or more and 5.0 or less.

A 40th invention is the heat ray-shielding laminated transparent base material, wherein at least one of the transparent base materials is a glass.

A 41st invention is an automobile, having the heat ray-shielding resin sheet material of the present invention, and the heat ray-shielding laminated transparent base material of the present invention mounted thereon as a window material.

A 42nd invention is a building, in which the heat ray-shielding resin sheet material of the present invention, and the heat ray-shielding laminated transparent base material of the present invention are used as window materials.

Advantage of the Invention

According to the present invention, by providing a coexistence state of composite tungsten oxide particles and a suitable selected wavelength absorbing material, a heat ray-shielding film mainly composed of polyvinyl acetal resin, etc., and capable of exhibiting excellent optical performance and high weather resistance and having a natural color tone, can be obtained. Then, by using this heat ray-shielding film, a heat ray-shielding laminated transparent base material capable of exhibiting excellent optical performance and high weather resistance and excellent mechanical properties, can be obtained. Further, by mounting this heat ray-shielding laminated transparent base material on an automobile as a window material, summer car temperature rise can be suppressed. Also, by using this heat ray-shielding laminated transparent base material for an opening part of a building as the window material, summer building temperature rise can be suppressed.

Further, according to the present invention, by containing the composite tungsten oxide particles and the selected wavelength absorbing material in the thermoplastic resin such as polyethylene terephthalate resin, polycarbonate resin, and acrylic resin, etc., in the coexistence state, the heat ray-shielding resin sheet material capable of exhibiting excellent optical performance and having a natural color tone, can be obtained. Moreover, by using this heat ray-shielding resin sheet material for an opening part of an automobile or a building as the window material, summer building or automobile temperature rise can be suppressed.

DETAILED DESCRIPTION OF THE INVENTION

An embodiment of the present invention will be described hereafter in detail.

A heat ray-shielding film of the present invention is configured so that a heat ray-shielding component (composite tungsten oxide particles) and a selected wavelength absorbing material are contained, and further a dispersant and an ultraviolet absorber, and optionally a plasticizer, and optionally the other additive are contained in a thermoplastic resin.

Further, the heat ray-shielding resin sheet material of the present invention is configured so that the heat ray-shielding component (composite tungsten oxide particles) and the selected wavelength absorbing material are contained and the dispersant and the ultraviolet absorber and optionally the other additive are contained in the thermoplastic resin such as polyethylene terephthalate resin, polycarbonate resin, and acrylic resin, etc.

First, explanation is given for the heat ray-shielding film of the present invention in detail in an order of [1] Component constituting the heat ray-shielding film, [2] Heat ray-shielding film, [3] Heat ray-shielding laminated transparent base material using this heat ray-shielding film, and thereafter a heat ray-shielding resin sheet material of the present invention.

[[Heat Ray-Shielding Film of the Present Invention]]
[1] Component Constituting the Heat Ray-Shielding Film As described above, the heat ray-shielding film of the present invention is configured so that a heat ray-shielding component (composite tungsten oxide particles) and a selected wavelength absorbing material are contained, and further a dispersant and an ultraviolet absorber, and optionally the other additive are contained in a thermoplastic resin. Therefore, detailed explanation will be given in an order of (1) Heat ray-shielding component (composite tungsten oxide particles), (2) Dispersant, (3) Selected wavelength absorbing material, (4) Ultraviolet absorber, (5) Thermoplastic resin, (6) Plasticizer, (7) Adhesive power adjustment agent, (8) Infrared absorbing organic compound, and (9) The other additive.

(1) Heat Ray-Shielding Component (Composite Tungsten Oxide Particles)

Preferably, the composite tungsten oxide particles are expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \le y \le 0.5$, $2.2 \le z \le 3.0$), and has a hexagonal crystal structure.

As a preferable example of the composite tungsten oxide particle, $Cs_{0.33}WO_3$ and $Rb_{0.33}WO_3$, can be given. If values of y and z are within the abovementioned range, a useful heat ray-shielding property can be obtained. An addition amount of element M is preferably 0.1 or more and 0.5 or less, and further preferably in the vicinity of 0.33. This is because a value theoretically calculated from the hexagonal crystal structure is 0.33, and a preferable optical performance can be obtained if the addition amount is around this value. Also, z is preferably in a range of $2.2 \le z \le 3.0$. This is because in the composite tungsten oxide material expressed by $M_yWO_z$ as well, a similar mechanism as the tungsten oxide material expressed by $WO_3$ works, and in addition, in the range of $z \le 3.0$ as well, free electrons are supplied by adding the abovementioned element M. However, more preferably the range is $2.45 \le z \le 3.00$, from a viewpoint of the optical performance.

The dispersed particle size of each composite tungsten oxide particle can be suitably selected, depending on a purpose of use of the heat ray-shielding film. For example, when the heat ray-shielding film is used for the purpose of use requiring a transparency, the composite tungsten oxide particle has the dispersed particle size of 40 nm or less preferably. If the composite tungsten oxide particle has the dispersed particle size of 40 nm or less, lights are not completely shielded due to scattering, and visibility of a visible light region can be maintained and simultaneously transparency can be efficiently maintained.

When the heat ray-shielding film of the present invention is applied to a car roof or a side window for example, especially with an emphasis on a transparency in a visible light region, reduction of scattering by the composite tungsten oxide particles is preferably taken into consideration. When further reduction of scattering is taken into consideration, the dispersed particle size of the composite tungsten oxide particle is set to 30 nm or less, and preferably 25 nm or less.

This is because if the dispersed particle size of the composite tungsten oxide particle is small, light scattering in the visible light region of a wavelength of 400 nm to 780 nm due to the geometrical scattering or the Mie scattering, is reduced in the visible light region of 400 nm to 780. By reducing the scattering of the light of this wavelength, the heat ray-shielding film has an outer appearance of a cloudy glass, and it is possible to avoid a situation in which clear transparency is lost.

This is because if the dispersed particle size of the composite tungsten oxide particle is 40 nm or less, the abovementioned geometrical scattering or the Mie scattering is reduced, and scattering becomes Rayleigh scattering. In the Rayleigh scattering, a scattered light is reduced in inverse proportion to the sixth power of a particle size, and therefore the scattering is reduced with a decrease of the dispersed particle size, and transparency is improved. Further, if the dispersed particle size is 25 nm or less, the scattered light is extremely small, and this is preferable.

As described above, the dispersed particle size is preferably small, from a viewpoint of avoiding the scattering of the light. Meanwhile, if the dispersed particle size of the composite tungsten oxide particle is 1 nm or more, an industrial manufacture is facilitated.

Further, an amount of the composite tungsten oxide particle contained in the heat ray-shielding film, is preferably 0.05 $g/m^2$ to 5.0 $g/m^2$ per unit area.

(2) Dispersant

A dispersant of the present invention is used for uniformly dispersing the composite tungsten oxide particles of the present invention into a thermoplastic resin described later.

The dispersant of the present invention is preferably the dispersant having a thermal decomposition temperature of 250° C. or more measured using a differential thermal-thermogravimetric simultaneous measurement apparatus (referred to as TG-DTA hereafter in some cases), and having urethane, acrylic, and styrene backbone. Here, the thermal decomposition temperature is the temperature at which a weight reduction is started due to a thermal decomposition of the dispersant, in the measurement based on JIS K 7120 using TG-DTA.

This is because if the thermal decomposition temperature is 250° C. or more, the dispersant is rarely decomposed during kneading with the thermoplastic resin. Thus, browning of the heat ray-shielding film due to decomposition of the dispersant, decrease of the visible light transmittance, and a situation in which an original optical performance cannot be obtained, can be avoided.

Further, the dispersant is preferably the dispersant having a group containing amine, a hydroxyl group, a carboxyl group, or an epoxy group as a functional group. These groups have an effect of adsorbing on the surface of the composite tungsten oxide particle, preventing an agglomeration of the composite tungsten oxide particles, and uniformly dispersing the particles even in the heat ray-shielding film. Specifically, acryl-styrene copolymer dispersant having the carboxyl group as a functional group, and an acrylic dispersant having amine as a functional group, can be given as examples. The dispersant containing amine in the functional group, is preferably the dispersant having a molecular weight of Mw2000 to 200000, and amine value of 5 to 100 mgKOH/g. Also, the dispersant having the carboxyl group is preferably the dispersant having the molecular weight of Mw2000 to 200000, acid value of 1 to 50 mgKOH/g.

The addition amount of the dispersant is preferably in a range of 10 wt. part. to 1000 wt. part. and more preferably 30 wt. part. to 400 wt. part, with respect to 100 wt. part. of the composite tungsten oxide particles. This is because if the addition amount of the dispersant is within the above range, the composite tungsten oxide particles are uniformly dispersed in the thermoplastic resin, and there is no adverse influence on physical properties of the obtained heat ray-shielding film.

(3) Selected Wavelength Absorbing Material

The selected wavelength absorbing material of the present invention is the material that selectively strongly absorbs only the light in a specific wavelength region.

As described above, the inventors of the present invention study on a YI calculation method of plastic described in JIS Z 8701 and JIS K 7373, in consideration of a wavelength distribution of a weight value factor used for calculating a visible light transmittance described in JIS R 3106. Then, as a result of the study, it is found that the coexistence state of the selected wavelength absorbing material and the composite tungsten oxide particles can be provided, the selected wavelength absorbing material having a strong absorption in the vicinity of the wavelength of 550 nm which is a wavelength region strongly absorbing the light in the vicinity of the wavelength of 420 nm, and not having absorption in the vicinity of the wavelength 550 nm which is the wavelength region largely contributing to calculating the visible light transmittance, and not having absorption of the light of a wavelength 460 nm which has a great influence on YI. Then, by using such a coexistence state of the selected wavelength absorbing material and the composite tungsten oxide particles, the selected wavelength absorbing material having strong absorption of the light in the vicinity of the wavelength 420 nm, and not having absorption in the vicinity of the wavelength 460 nm and in the vicinity of the wavelength 550 nm, a lower solar transmittance can be obtained without raising YI of the heat ray-shielding laminated transparent base material YI, compared with a case of using the composite tungsten oxide particle alone.

Further, for example, when the heat ray-shielding laminated transparent base material is used as a member whose high visibility is required like an automobile roof or a side window, fine particles such as contained composite tungsten oxide particles, etc., strongly scatters a short wavelength region of the visible light at the time of irradiating the heat ray-shielding laminated base material with a strong light such as a direct sunlight or headlamps, thus involving a problem that the following phenomenon occurs: the heat ray-shielding film in the heat ray-shielding laminated transparent base material becomes cloudy pale.

Here, by absorbing the scattered light in a visible light short wavelength region, which is generated by scattering the selected wavelength absorbing material by the fine particles such as composite tungsten oxide particles, the occurrence of the cloudy pale phenomenon can be suppressed, and the effect of increasing the transparency of the heat ray-shielding laminated transparent base material of the present invention can be exhibited.

As the optical performance of the selected wavelength absorbing material of the present invention, the transmittance of the light of a wavelength 420 nm is preferably 40% or less when the transmittance of the light of a wavelength of 550 nm is 90% or more and the transmittance of the light of a wavelength of 460 nm is 90% or more, in the selected wavelength absorbing material itself excluding the absorption of the medium and the base material. Further, the transmittance of the light of a wavelength of 420 nm is preferably 15% or less when the transmittance of the light of a wavelength of 550 nm is 90% or more and the transmittance of the light of a wavelength of 460 nm is 90% or more.

This is because when the wavelength absorption material is selected having the transmission profile as follows: the transmittance of the light of a wavelength of 420 nm can be set to 40% or less when the transmittance of the light of a wavelength of 550 nm is 90% or more and the transmittance of the light of a wavelength of 460 nm is 90% or more, and the coexistence state of this selected wavelength absorbing material and the composite tungsten oxide particles can be provided, the visible light transmittance is not decreased, and YI of the base material is not largely increased, and further absorption of the light in the vicinity of the wavelength 420 nm can be sufficiently obtained, and as a result, compared to a case of using the composite tungsten oxide particle alone, there is no great change in the color tone, and the solar transmittance is decreased, thereby improving the heat-shielding performance.

As a specific selected wavelength absorbing material used in the present invention, the benzotriazole compound, the benzotriazole derivative compound, the benzophenone compound, the hydroxy phenylalanine compound, the indole compound, and the azomethine compound, etc., can be given. Particularly, the benzotriazole compound, the benzotriazole derivative compound or the indole compound is preferable. This is because the benzotriazole compound, the benzotriazole derivative compound, or the indole compound has a sharp absorption peak compared to the ultraviolet absorber such as the benzophenone compound and the hydroxyphenyltriazine compound having a similar absorption performance. Therefore, even when an amount sufficient to absorb the light in the vicinity of the wavelength 420 nm is added to the heat ray-shielding film, rise of YI of the base material is very small.

When the benzotriazole compound is used as the selected wavelength absorbing material of the present invention, the compound expressed by [Chemical formula 1] is preferably used. This is because the compound expressed by the [Chemical formula 1] has a characteristic of having a strong absorption peak in a wavelength of 360 nm to 390 nm, and meanwhile, absorption of the wavelength having an influence on YI of the heat ray-shielding film is weak. Further, this is because absorbance at the absorption peak is very high compared to the general benzotriazole compound, and solubility of the polyvinyl butyral resin is also high, and further weather resistance is also excellent.

carbon atoms in the alkyl group is 2 to 10, an aryl group, an acyl group, a sulfo group, a cyano group, a group expressed by [Chemical formula 2], a group expressed by [Chemical formula 3], a group expressed by [Chemical formula 4], and a group expressed by [Chemical formula 5], wherein R2 is an alkylene group having 1 to 8 carbon atoms, and R3 is the hydrogen atom or a methyl group, and R4 is the alkylene group having 1 to 8 carbon atoms.

[Chemical formula 2]

[Chemical formula 3]

[Chemical formula 4]

[Chemical formula 5]

Further, the benzotriazole compound expressed by any one of the [Chemical formula 6] to [Chemical formula 10] can be particularly preferably used as the selected wavelength absorbing material of the present invention. This is because the compound having these chemical formulas has the characteristic that the transmittance of the light of a wavelength of 420 nm is 0.1% or less and extremely low when the transmittance of the light of a wavelength of 550 nm is 90% or more and the transmittance of the light of a wavelength of 460 nm is 90% or more, and the absorbance of the light of a wavelength of 420 nm is higher compared to a similar compound, and in addition, the weather resistance is high compared to other selected wavelength absorbing material.

[Chemical formula 1]

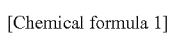
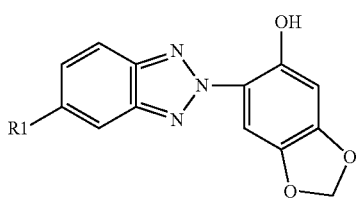

Wherein in the [Chemical formula 1], R1 is selected from a hydrogen atom, a halogen atom, an alkyl group, an alkoxy group, a hydroxyl group, an amino group, straight or branched chain mono-substituted amino group, straight or branched chain di-substituted amino group, a nitro group, a carboxyl group, an alkylcarbonyloxy alkyl group in which carbon atoms in an alkyl group are each 1 to 8, the alkyloxycarbonyl alkyl group in which the sum of the

[Chemical formula 6]

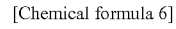
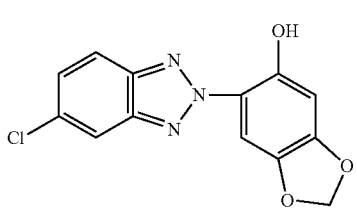

[Chemical formula 7]

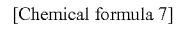
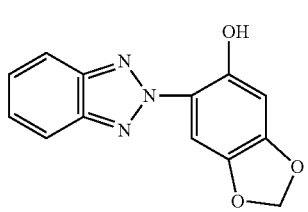

[Chemical formula 8]

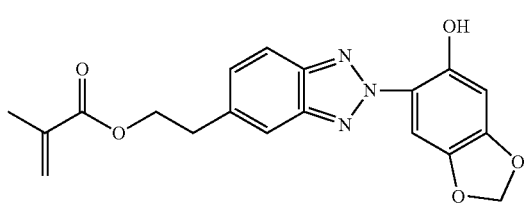

[Chemical formula 9]

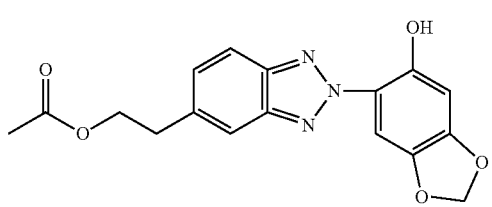

[Chemical formula 10]

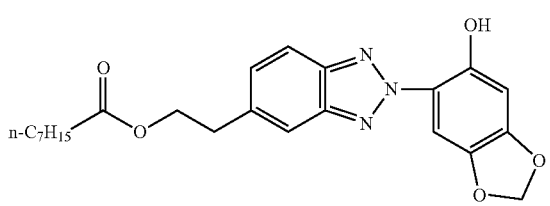

On the other hand, when the indole compound is used as the selected wavelength absorbing material of the present invention, the compound expressed by [Chemical formula 11] is preferably used. Wherein, R expressed by [Chemical formula 11] is the alkyl group having 1 to 10 carbon atoms or the aralkyl group having 7 to 10 carbon atoms. The alkyl group having 1 to 10 carbon atoms includes the methyl group, the ethyl group, the butyl group, and 2-ethylhexyl group, etc., and the aralkyl group having 7 to 10 carbon atoms includes the phenylmethyl group, etc. Above all, the indole compound in which R is the methyl group out of the indole compounds expressed by [Chemical formula 11], namely the compound expressed by [Chemical formula 12] is particularly preferable as the selected wavelength absorbing material of the present invention, because the transmittance of the light of a wavelength of 420 nm is 0.1% or less and extremely low, when the transmittance of the light of a wavelength of 550 nm is 90% or more and the transmittance of the light of a wavelength of 460 nm is 90% or more, and the absorbance of the light of a wavelength of 420 nm is higher compared to a similar compound.

Even if the compound is not the indole compound expressed by [Chemical formula 11], it is possible to suitably use the compound having an indole backbone and having the profile of the indole compound itself excluding the absorption of the medium or the base material, as long as the indole compound has the profile that the transmittance of the light of a wavelength of 420 nm can be set to 40% or less when the transmittance of the light of a wavelength 550 nm is 90% or more and the transmittance of the light of a wavelength 460 nm is 90% or more.

[Chemical formula 11]

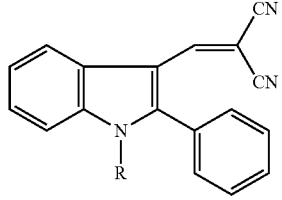

[Chemical formula 12]

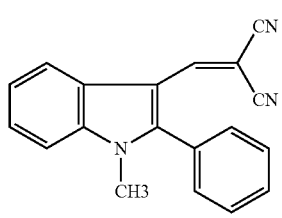

The content of the selected wavelength absorbing material in the heat ray-shielding film is preferably 0.01 mass % or more and 2.0 mass % or less. This is because if the content is 0.01 mass % or more, improvement of the heat-shielding performance can be significantly observed, as compared to a state in which the selected wavelength absorbing material is not allowed to coexist.

This is because if the content is 2.0 mass % or less, absorption of the light having an influence on YI is not excessively strong, and the color tone of the heat ray-shielding film is maintained. Further, if the content is 2.0 mass % or less, the selected wavelength absorbing material is not precipitated in the heat ray-shielding film, thus not having a great influence on the strength or adhesive power of the film and a penetration resistance.

As a method of adding the selected wavelength absorbing material to the heat ray-shielding film, a method of uniformly dispersing the selected wavelength absorbing material in the heat ray-shielding film without damaging the transparency of the obtained heat ray-shielding film, may be suitably used.

(4) Ultraviolet Absorber

In the heat ray-shielding film of the present invention, when the indole compound or the azomethine compound, or a specific benzotriazole compound or the benzotriazole derivative compound having a high absorption coefficient of a light of a wavelength 420 nm, is used for example as the selected wavelength absorbing material, the ultraviolet absorber is preferably further added.

A first reason why the ultraviolet absorber is preferably further added to the heat ray-shielding film of the present invention, is that although the indole compound and the azomethine compound efficiently absorb the visible light of a short wavelength, effective absorption can be obtained in the ultraviolet region by adding the ultraviolet absorber.

By sufficiently cutting the light in the ultraviolet region, an effect of suppressing a further higher temperature rise can be obtained. Further, an influence of the ultraviolet radiation to an automotive interior or a human or an interior decoration inside of a building equipped with the heat ray-shielding laminated transparent base material of the present invention, and sunburn or a degradation of furniture or the interior decoration, etc., can be sufficiently prevented.

A second reason is that by adding the ultraviolet absorber, photodegradation of the selected wavelength absorbing material due to a solar light, etc., can be suppressed by adding the ultraviolet absorber.

As a result, even when the heat ray-shielding laminated transparent base material of the present invention is actually used for a long time as the window material of the automobiles or the buildings, the photodegradation of the selected wavelength absorbing material due to the solar light, etc., can be suppressed by further adding the ultraviolet absorber to the heat ray-shielding film of the present invention.

The abovementioned ultraviolet absorber includes an organic ultraviolet absorber such as a benzophenone compound, a salicylate compound, a HALS compound, a benzotriazole compound, a triazine compound, a benzotriazolyl compound, and a benzoyl compound, and an inorganic ultraviolet absorber such as zinc oxide, titanium oxide, and cerium oxide, etc., and above all, the benzotriazole compound the benzophenone compound are particularly preferable. This is because the benzotriazole compound and the benzophenone compound have very high visible light transmittance even when a concentration of sufficiently absorbing the UV-ray is added, and have a high durability to a long time exposure of a strong UV-ray.

As preferable specific examples of the ultraviolet absorber, [Chemical formula 15] and [Chemical formula 16] can be given.

[Chemical formula 15]

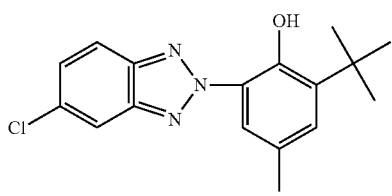

[Chemical formula 16]

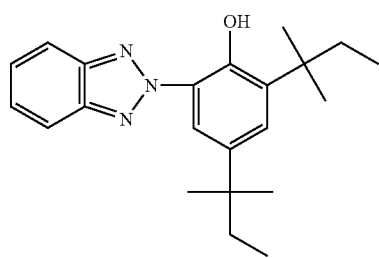

The content of the ultraviolet absorber in the heat ray-shielding film is preferably 0.02 mass % or more and 5.0 mass % or less. This is because if the content is 0.02 mass % or more, the UV-ray that cannot be completely absorbed by the selected wavelength absorbing material can be sufficiently absorbed, and the photodegradation of the selected wavelength absorbing material can be sufficiently prevented. Further, this is because if the content is 5.0 mass % or less, the ultraviolet absorber is not precipitated in the heat ray-shielding film, thus not having a great influence on the strength, adhesive power of the film, and a penetration resistance.

On the other hand, a part of the benzotriazole compound has a large absorption coefficient of at a wavelength of 420 nm. Therefore, by adding a substantial amount of these compounds to the heat ray-shielding film, the abovementioned effect can be exhibited: namely, the transmittance of the light of the wavelength of 420 nm can be set to 40% or less when the transmittance of the light of the wavelength of 550 nm is 90% or more and the transmittance of the light of the wavelength of 460 nm is 90% or more. According to this constitution, these compounds have both of the effects of the selected wavelength absorbing material and the ultraviolet absorber.

On the other hand, the compounds such as benzophenone compound triazine compound, benzotriaxolyl compound, and benzoyl compound, have the absorption coefficient at a wavelength of 420 nm, although lower than the indole compound and the azomethine compound. Therefore, by adding the substantial amount of these compounds to the heat ray-shielding film, the abovementioned effect can be exhibited: namely, the transmittance of the light of a wavelength of 420 nm can be set to 40% or less when the transmittance of the light of a wavelength of 550 nm is 90% or more and the transmittance of the light of a wavelength of 460 nm is 90% or more. With this constitution as well, these compounds have both of the effects of the selected wavelength absorbing material and the ultraviolet absorber.

(5) Thermoplastic Resin

As the thermoplastic resin used for the heat ray-shielding film of the present invention, arbitrary thermoplastic resin used for a publicly-known laminated transparent base material can be used. Especially, polyvinyl acetal resin and an ethylene-vinyl acetate copolymer are preferable from a point of an adhesion to the transparent base material, weather resistance, and penetration resistance, etc. As the polyvinyl acetal resin, polyvinyl butyral resin is preferable from the point of the adhesion, the weather resistance, and the penetration resistance. Further, a plurality of kinds of polyvinyl acetal resins having different acetalization degrees may be used in combination, in consideration of the physical property of the heat ray-shielding film. Further, co-polyvinyl acetal resin obtained by combining plural kinds of aldehydes at the time of acetalization and causing a reaction between them, can be preferably used.

From this viewpoint, a preferable lower limit and upper limit of the acetalization of the polyvinyl acetal resin is 60% and 75% respectively.

The polyvinyl acetal resin can be prepared by acetalizing polyvinyl alcohol to aldehyde.

The polyvinyl alcohol is usually obtained by saponifying polyvinyl acetate, and generally polyvinyl alcohol with a saponifying degree of 80 to 99.8 mol % is used.

Further, a preferable lower limit and a preferable upper limit of the polyvinyl alcohol is 200 and 3000 respectively. This is because if a polymerization degree is 200 or more, resistance to penetration through the manufactured heat ray-shielding laminated transparent base material is maintained, and a safety can be maintained, and on the other hand, if the polymerization degree is 3000 or less, moldability of the resin film is maintained, then rigidity of the resin film is also maintained within a preferable range, and processability is maintained.

The aldehyde is not particularly limited, and generally aldehyde having 1 to 10 carbon atoms such as n-butyraldehyde, isobutyraldehyde, 2-ethyl butyraldehyde, n-hexyl aldehyde, n-octyl aldehyde, and acetaldehyde can be used. Above all, n-butyraldehyde, and n-hexyl aldehyde are preferable, and more preferably n-valeraldehyde, and more preferably butyraldehyde having 4 carbon atoms can be used.

(6) Plasticizer

When the flexibility and the adhesion to the transparent base material are not sufficiently exhibited by the thermoplastic resin of the present invention alone, for example when the thermoplastic resin of the present invention is the polyvinyl acetal resin, it is preferable to further add the plasticizer. On the other hand, when the resin with excellent flexibility and adhesion to the transparent base material or the thermoplastic resin with improved flexibility and adhesion to the transparent base material by copolymerization, etc., is used, there is no necessity for having the structure of adding the plasticizer. As an example of the resin to which the plasticizer is not required to be added as the component of the heat ray-shielding film of the present invention, ethylene-vinyl acetate copolymer can be given. Of course, even in a case of the resin to which the plasticizer is not required to be added, the plasticizer can be added as desired, for further improving the flexibility and the adhesion to the transparent base material.

A substance generally used as the plasticizer in the thermoplastic resin of the present invention, can be used as the plasticizer. A plasticizer as an ester compound of monohydric alcohol and organic acid, a plasticizer of an ester base such as an ester compound of a polyhydric alcohol and organic acid, and a plasticizer of a phosphoric acid base such as an organic phosphoric acid-based plasticizer, can be used as the plasticizer used for the heat ray-shielding film mainly composed of polyvinyl acetal resin for example. Any one of these plasticizers is preferably in a liquid state at a room temperature. Particularly, the plasticizer as an ester compound synthesized from polyhydric alcohol and fatty acid, is preferable.

The ester compound synthesized from the polyhydric alcohol and the fatty acid, is not particularly limited, and for example a glycol ester compound obtained by a reaction between glycol such as triethylene glycol, tetraethylene glycol, and tripropylene glycol, and monobasic organic acid such as butyric acid, isobutyric acid, caproic acid, 2-ethyl butyric acid, heptyl acid, n-octyl acid, 2-ethylhexyl acid, pelargonic acid (n-nonyl acid), and decyl acid, etc., can be given, and also an ester compound, etc., of the tetraethylene glycol, tripropylene glycol, and the monobasic organic acid, can be given.

Above all, fatty acid ester of triethylene glycol such as triethylene glycol hexanate, triethylene glycol di-2-ethyl butyrate, triethylene glycol di-okutaneto, and triethylene glycol di-2-ethyl hexanoate, etc., is suitably used. The fatty acid ester of the triethylene glycol has well-balanced various properties such as a compatibility with polyvinyl acetal and a cold resistance, and has excellent processability and economic efficiency.

It should be noted that the plasticizer is less hydrolyzable in selecting the plasticizer. From this viewpoint, triethylene glycol di-2-ethylhexanoate, triethylene glycol di-2-ethyl butyrate, and tetraethylene glycol di-2-ethylhexanoate are preferable.

(7) Adhesive Force Control Agent

An adhesive force control agent is preferably contained as desired, in the heat ray-shielding film of the present invention.

The adhesive force control agent is not particularly limited, and alkali metal salts and/or alkaline earth metal salts are preferably used. Acid constituting the metal salt is not particularly limited, and for example, carboxylic acids such as octylic acid, hexyl acid, butyric acid, acetic acid, formic acid, and inorganic acids such as hydrochloric acid and nitric acid, etc., can be used. Among alkali metal salts and/or alkaline earth metal salts, carboxylic acid magnesium salt having 2 to 16 carbon atoms, and potassium carboxylate having 2 to 16 carbon atoms are preferable.

Carboxylic acid magnesium salt and potassium salt of an organic acid having 2 to 16 carbon atoms, are not particularly limited, and for example, For example, magnesium acetate, potassium acetate, magnesium 2-ethyl butyrate, magnesium propionate, potassium propionate, 2-ethylbutane magnesium, potassium 2-ethylbutane, magnesium 2-ethylhexanoate, and 2-potassium ethylhexanoate etc., are suitably used. Above all, it is known that magnesium 2-ethyl butyrate has a high performance as the adhesive force control agent, and also has an effect of the composite tungsten oxide particles such as improving the weather resistance in the heat ray-shielding film mainly composed of polyvinyl acetal resin, and this is preferable.

These adhesive force control agent may be used alone or two or more kinds may be used together.

In the case of using the carboxylic acid salt of sodium, potassium, magnesium, calcium, and cerium as the adhesive force control agent, it is possible to obtain both effects of an action as an original adhesive force control agent, and the effect of the composite tungsten oxide particles such as improving the weather resistance.

(8) Infrared Absorbing Organic Compound

In the present invention, an infrared absorbing organic compound having a strong absorption in a near infrared region may be further added to the heat ray-shielding film as desired.

A material that strongly absorbs a light in a range of a visible light wavelength region to a near infrared region of a wavelength of 650 nm to 1000 nm is preferable as the infrared absorbing organic compound. This is because a large synergistic effect can be obtained when an infrared absorbing organic compound having the above optical performance is allowed to coexist with the composite tungsten oxide particles having a strong absorption in the wavelength region longer than the wavelength of 800 nm, and a high heat-shielding performance can be obtained, compared to a case of using the composite tungsten oxide particles alone.

As the infrared absorbing organic compound used for this purpose, phthalocyanine, compounds, naphthalocyanine compounds, imonium compounds, diimonium compound, polymethine compounds, diphenylmethane compounds, triphenylmethane compounds, quinone compounds, azo compounds, pentadiene compounds, azomethine compounds, squarylium compounds, organometallic complexes, and cyanine compounds, can be used. Further, from the abovementioned viewpoint, diimonium compounds and phthalocyanine compounds are preferable.

The content of the infrared absorbing organic compound in the heat ray-shielding film of the present invention is preferably 0.02 mass % or more and 0.2 mass % or less. If a mixing ratio of the addition amount of the infrared absorbing organic compound is 0.02 mass % or more, this is preferable because the effect of strongly absorbing the light in the range of the visible light wavelength region to the near infrared region of a wavelength 650 nm to 1000 nm can be obtained. Also, if the mixing ratio of the addition amount of the infrared absorbing organic compound is 0.2 mass % or less by a weight ratio, reduction of the visible light transmittance and increase of a yellow value can be avoided by the infrared absorbing organic compound, because the light in the vicinity of the wavelength of 550 nm is absorbed which is a wavelength region that greatly contributes to calculating the visible light transmittance, and because the light in the vicinity of the wavelength of 460 nm is absorbed which is the light having an influence on the yellow value of the film. As a result, even if the visible light transmittances coincide with each other, the heat-shielding performance and the color are secured, and this is preferable.

(9) Other Additive

It is also possible to mix a general additive as desired, to the heat ray-shielding film of the present invention. For example, in order to provide an arbitrary color tone as desired, dye compounds or pigment compounds such as azo-based dyes, cyanine dyes, quinolone-based dyes, perylene-based dyes, and carbon black, etc., generally used for coloring the thermoplastic resin, may be added. Particularly, in the present invention, since the short wavelength side light of the visible light is absorbed, color of a transmitted light is yellowish. Therefore, it is preferable to control the color tone of the heat ray-shielding film by adding the compounds of the dyes or pigments.

Further, coupling agents, surfactants, antistatic agents, and antioxidants, etc., can be added as other additives.

[2] Heat Ray-Shielding Film

In order to produce the heat ray-shielding film of the present invention, (i) a dispersion liquid in which composite tungsten oxide particles and a dispersant are dispersed in a general organic solvent, and thereafter the organic solvent is removed, to thereby produce a composite tungsten oxide particle dispersion body, with the composite tungsten oxide particles dispersed in a solid dispersant, or (ii) in the case of using the thermoplastic resin requiring to use the plasticizer as the heat ray-shielding film of the present invention, it is also possible to produce the composite tungsten oxide particle dispersion liquid, by dispersing the composite tungsten oxide particles and the dispersant in a part of the plasticizer added to the thermoplastic resin.

Then, the produced composite tungsten oxide particle dispersion body, or the produced composite tungsten oxide particle dispersion liquid, the selected wavelength absorbing material, the polyvinyl acetal resin, optionally the plasticizer, preferably the ultraviolet absorber, and other additive or the adhesive force control agent as desired, are mixed and kneaded, which is then molded into a film shape for example, by a publicly-known method such as an extrusion molding method or a calendar molding method, etc., to thereby produce the heat ray-shielding film. Further, higher heat-shielding performance can be obtained by adding the infrared absorbing organic compound as desired, to the heat ray-shielding film.

A method of producing the composite tungsten oxide particle dispersion body and a method of producing the composite tungsten oxide particle dispersion liquid, will be described hereafter.

(1) Method of Producing the Composite Tungsten Oxide Particle Dispersion Body

The composite tungsten oxide particles and the dispersant are added and mixed into the organic solvent, to thereby obtain an organic solvent dispersion liquid of the composite tungsten oxide particles using a general dispersion method. Specifically, dispersion methods such as a bead mill, a ball mill, a sand mill, and an ultrasonic dispersion, can be used.

The organic solvent having a boiling point of 120° C. or less is preferably used. This is because if the boiling point is 120° C. or less, it is easy to remove the organic solvent in a drying step which is a subsequent process, and particularly by vacuum drying. As a result, removal of the organic solvent proceeds quickly in the step of vacuum drying, thereby contributing to a productivity of a composite tungsten oxide particle-containing composition. Further, since the step of vacuum drying proceeds easily and sufficiently, it is possible to prevent an excessive organic solvent from being remained in the composite tungsten oxide particle-containing composition. As a result, it is possible to prevent an occurrence of bubbles during molding the heat ray-shielding film. Specifically, toluene, methyl ethyl ketone, methyl isobutyl ketone, butyl actate, isopropyl alcohol, and ethanol, etc., can be given. However, a material having a boiling point of 120° C. or less and in which the composite tungsten oxide particles can be uniformly dispersed, can be arbitrarily selected.

Further, as a method of removing the organic solvent from the organic solvent dispersion liquid of the composite tungsten oxide particles, a vacuum drying method is preferable. Specifically, the organic solvent dispersion liquid of the composite tungsten oxide particles is subjected to vacuum drying while stirring, to thereby separate the composite tungsten oxide particle-containing composition from an organic solvent component. A vacuum stirring-type drier can be given as an apparatus used for the vacuum drying. However, an apparatus having the abovementioned function can be used, and is not particularly limited. Further, a pressure for vacuuming in the drying step is suitably selected.

By using the vacuum drying method, an efficiency of removing the solvent is improved, without exposing the composite tungsten oxide particle-containing composition to a high temperature for a long time, thus not allowing an agglomeration of the dispersed particles to occur, and this is preferable. The productivity is also improved, and recovery of an evaporated organic solvent is easy. This is also preferable from an environmental consideration.

(2) Method of Producing the Composite Tungsten Oxide Particle Dispersion Liquid

The composite tungsten oxide particles and the dispersant are added and mixed into the plasticizer, to thereby obtain a plasticizer dispersion liquid of the composite tungsten oxide particles using a general dispersion method. Specifically, dispersion methods such as a bead mill, a ball mill, a sand mill, and an ultrasonic dispersion, can be used.

The concentration of the composite tungsten oxide particles in the plasticizer is preferably 50 mass % or less. This is because if the concentration of the composite tungsten oxide particles in the plasticizer is 50 mass % or less, the agglomeration of the particles hardly occurs, the dispersion is easy, rapid increase of viscosity can be prevented, and handling is easy.

[3] Heat Ray-Shielding Laminated Transparent Base Material

The heat ray-shielding laminated transparent base material using the heat ray-shielding film of the present invention, has various forms.

For example, a heat ray-shielding laminated inorganic glass using an inorganic glass as the transparent base material, is obtained by integrally laminating a plurality of opposing inorganic glasses, with the heat ray-shielding film of the present invention interposed between them. The obtained heat ray-shielding laminated inorganic glass can be used mainly as a front inorganic glass of an automobile, and as a window of a building.

Further, it is also preferable to form the heat ray-shielding laminated transparent base material, by using the heat ray-shielding film of the present invention and an infrared reflection film described later together. When this structure is employed, the infrared reflection film is interposed between the heat ray-shielding film and a transparent resin film to form an integral multilayer film. The obtained multilayer film is interposed between the opposing plural inorganic glasses, and is integrally laminated by a publicly-known method, to thereby obtain the heat ray-shielding laminated inorganic glass.

Here, when the heat ray-shielding laminated inorganic glass is attempted to be used for automobiles, a preferable constitution is that the infrared reflection film is positioned outside of the heat ray-shielding film of the present invention in the automobile.

The heat-shielding performance of the heat ray-shielding laminated transparent base material of the present invention is expressed by a solar transmittance to a visible light transmittance. The visible light transmittance and the solar transmittance are defined by JIS R 3106. As the solar transmittance to the visible light transmittance is lower, the heat ray-shielding laminated transparent base material having excellent light-shielding performance is obtained. Specifically, when the visible light transmittance is 70%, the solar transmittance is preferably 32.5% or less, and further preferably 31% or less, and further more preferably 30% or less.

Particularly, this is because when the heat ray-shielding laminated transparent base material of the present invention is used for the window material such as a front glass of the automobiles, high heat ray-shielding ability is required while satisfying the transmission of 70% or more defined by Road Trucking Vehicle Act. Incidentally, if the solar transmittance of the heat ray-shielding laminated transparent base material is 32.5% or less, air-conditioning power consumption when an outside air temperature is 30° C. or more, is cut by 5% or more, compared to a case that a normal laminated glass is mounted thereon. As a result, consumption of batteries is suppressed in motor vehicles using batteries, such as hybrid and electric vehicles, and therefore a significant effect such as extension of a traveling range, is observed. Accordingly, fuel efficiency of automobiles is improved, thereby making it possible to expect a contribution to cutting greenhouse gas emissions, and it is expected that the heat ray-shielding laminated transparent base material of the present invention becomes an essential member for designing automobiles.

The heat ray-shielding laminated transparent base material of the present invention has preferably a natural color tone (transparent or achromatic color) when being used for the automobiles and buildings as a window material.

Especially, if the heat ray-shielding laminated transparent base material of the present invention is used for the front glass, etc., of the automobiles, the color of a fluoroscopic image can be preferably identified for securing a safety during drive.

From this viewpoint, it is preferable to normally identify the color of the fluoroscopic image in a color identification test for the heat ray-shielding film of the present invention, based on JIS R 3211 and JIS R 3212 which define a performance requested for the laminated glass for automobiles for example.

Here, if YI of the heat ray-shielding film of the present invention is −20.0 or more and 10.0 or less, the color of the fluoroscopic image can be normally identified. Then, by having the constitution in which the selected wavelength absorbing material of the present invention is added, YI of the heat ray-shielding film of the present invention can be set to −20.0 or more and 10.0 or less. If YI of the heat ray-shielding film is −20.0 or more and 5.0 or less, the color of the fluoroscopic image can be further easily identified, and this is more preferable.

The heat ray-shielding laminated transparent base material can also be obtained, by using the transparent resin as the transparent base material, similarly to the abovementioned inorganic glass, or in combination with the inorganic glass, with the heat ray-shielding film interposed between the opposing transparent base materials. The purpose of use of the heat ray-shielding laminated transparent base material is the same as the abovementioned heat ray-shielding laminated inorganic glass.

Further, of course it is possible to use the heat ray-shielding laminated transparent base material as the heat ray-shielding film of the present invention as a single body, or with the heat ray-shielding film of the present invention positioned on one surface or both surfaces of the transparent base material such as inorganic glass or transparent resin, etc.

Here, explanation is given for the infrared reflection film used in combination with the heat ray-shielding film of the present invention.

In view of the optical performance in the case of the use in combination with the heat ray-shielding film of the present invention, it is preferable that the infrared reflection film has almost no absorption of the solar light in the visible light region, and reflection occurs only in the range from the visible light region to the near infrared region, specifically in the range from the wavelength 700 nm to 1200 nm, from a viewpoint of the heat ray-shielding function.

Specifically, as the optical performance of the infrared reflection film, preferably the visible light transmittance is 85% or more, and the solar reflectance is 18% or more, and more preferably the visible light transmittance is 88% or more and the solar reflectance is 21% or more.

Further, when use of the heat ray-shielding laminated transparent base material is taken into consideration as the front glass of the automobiles or the window material of the buildings, the infrared reflection film of the present invention capable of transmitting electromagnetic waves in a wavelength band for mobile phones and ETC, is preferable. Accordingly, a resin multilayer film that allows the electromagnetic wave to transmit, or a film having a property of reflecting the infrared ray by a cholesteric liquid crystal, is more preferable than a metal film-attached film having conductivity and not transmitting the electromagnetic wave.

[4] Conclusion

As described above in detail, the composite tungsten oxide particle dispersion body of the present invention, or the composite tungsten oxide particle dispersion liquid of the present invention, the selected wavelength absorbing material, the thermoplastic resin, and the plasticizer as needed, are mixed and kneaded, which is then molded into a film shape, by a publicly-known method, and the heat ray-shielding film of the present invention can be provided.

Then, by positioning the heat ray-shielding film of the present invention so as to be interposed between the opposing plural transparent base materials, the heat ray-shielding laminated transparent base material of the present invention can be produced, which is capable of maintaining a high transmittance in the visible light region and exhibiting a low solar transmittance.

Then, by providing a coexistence state of the composite tungsten oxide particles and the selected wavelength absorbing material not having absorption in the vicinity of the wavelength of 550 nm, and not having absorption in the vicinity of the wavelength of 460 nm, and having a large absorption in the vicinity of the wavelength of 420 nm, further higher heat-shielding performance can be exhibited, compared to the case of using the composite tungsten oxide particles alone.

[Heat Ray-Shielding Resin Sheet Material of the Present Invention]

The heat ray-shielding resin sheet material of the present invention is configured to contain the heat ray-shielding component (composite tungsten oxide particles) and the selected wavelength absorbing material in the thermoplastic resin, and further contain the dispersant, the ultraviolet absorber, and other additive as desired.

[1] Component constituting the heat ray-shielding resin sheet material, [2] Method of producing the heat ray-shielding resin sheet material, and [3] Shielding performance of the heat ray-shielding resin sheet material according to the present invention, will be described in detail hereafter.

[1] Component Constituting the Heat Ray-Shielding Resin Sheet Material

As described above, the heat ray-shielding resin sheet material of the present invention is configured to contain the heat ray-shielding component (composite tungsten oxide particles) and the selected wavelength absorbing material in the thermoplastic resin, and further contain the dispersant, the ultraviolet absorbent, and other additive as desired.

Incidentally, explanation for the heat ray-shielding component (composite tungsten oxide particles), the selected wavelength absorbing material, the dispersant, the ultraviolet absorber, the infrared absorbing organic compound, and other additive, is overlapped with the explanation described in a column of the component constituting the [1] heat ray-shielding film in the [heat ray-shielding film of the present invention].

Therefore, an additional explanation for the selected wavelength absorbing material and an explanation for the thermoplastic resin of the heat ray-shielding resin sheet, are given as follows.

(1) Selected Wavelength Absorbing Material

When the heat ray-shielding resin sheet material of the present invention is used for the automobiles and the buildings as a window material, the color is preferably close to the natural color tone (transparent or achromatic color). Especially, if the heat ray-shielding resin sheet material of the present invention is attempted to be used for the front glass, etc., of the automobiles, the color of the fluoroscopic image can be preferably normally identified for securing the safety during drive.

From this viewpoint, it is preferable to normally identify the color of the fluoroscopic image in the color identification test for the heat ray-shielding film of the present invention, for example based on JIS R 3211 and JIS R 3212 which define the performance requested for the laminated glass for automobiles.

Here, if YI of the heat ray-shielding resin sheet material of the present invention is −20.0 or more and 10.0 or less, the color of the fluoroscopic image can be normally identified. Then, by having the constitution in which the selected wavelength absorbing material is added, as described in the column of the component constituting the [1] heat ray-shielding film in the [heat ray-shielding film of the present invention], YI of the heat ray-shielding resin sheet material of the present invention can be set to −20.0 or more and 10.0 or less. If YI of the heat ray-shielding resin sheet material is −20.0 or more and 5.0 or less, the color of the fluoroscopic image can be further easily identified, and this is more preferable.

As the method of adding the selected wavelength absorbing material to the heat ray-shielding resin sheet material, the selected wavelength absorbing material itself can be added to the composite tungsten oxide particle plasticizer dispersion liquid described later, or to the polyvinyl acetal resin and the plasticizer together with the composite tungsten oxide particle plasticizer dispersion body.

However, if the transparency of the obtained heat ray-shielding resin sheet material is taken into consideration, similarly to the abovementioned composite tungsten oxide particles, the selected wavelength absorbing material can also be added to the heat ray-shielding resin sheet material, as the dispersion liquid with the selected wavelength absorbing material dispersed in the plasticizer, or as the dispersion body with the selected wavelength absorbing material dispersed in the solid dispersant.

In any case, it is sufficient that the selected wavelength absorbing material is uniformly dispersed in the heat ray-shielding resin sheet material, and if the transparency of the obtained heat ray-shielding resin sheet material is not damaged by this method, this method is suitably used.

(2) Thermoplastic Resin

As the thermoplastic resin used for the heat ray-shielding resin sheet material of the present invention, arbitrary resin can be used. However, the resin having a sufficient transparency is preferable, in consideration of the use of the heat ray-shielding resin sheet material of the present invention for each kind of window material.

Specifically, a preferable resin can be one kind of resin selected from the resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorocarbon resin, and ethylene-vinyl acetate copolymer, or a mixture of two or more kinds of resins selected from the resin group, or a copolymer of two or more kinds of resins selected from the resin group.

Polyethylene terephthalate resin, polycarbonate resin, and acrylic resin are preferable, and polycarbonate resin is more preferable, in consideration of high transparency above all, and general characteristics required as a window material, that is, stiffness, light weight, long-term durability, and cost, etc.

The polycarbonate resin used for the heat ray-shielding resin sheet material of the present invention, can be obtained by causing a reaction between a dihydric phenol and a carbonate-based precursor using a solution method or a melting method. The dihydric phenol includes 2,2-bis(4-hydroxyphenyl) propane [bisphenolA], 1,1-bis(4-hydroxyphenyl) ethane, 1,1-bis(4-hydroxyphenyl) cyclohexane, 2,2-bis(4-hydroxy-3,5-dimethylphenyl) propane, 2,2-bis(4-hydroxy-3,5-dibromo phenyl) propane, 2,2-bis(4-hydroxy-3-methylphenyl) propane, bis (4-hydroxyphenyl) sulfide, and bis(4-hydroxyphenyl) sulfone, as typical examples.

Also, a preferable dihydric phenol includes alkane series his (4-hydroxyphenyl), and the dihydric phenol mainly composed of bisphenolA is especially preferable.

[2] Method of Producing the Heat Ray-Shielding Resin Sheet Material

Explanation is given for the method of producing the heat ray-shielding resin sheet material of the present invention in an order of (1) Method of producing particles having a heat ray-shielding function, (2) Method of producing a dispersion body having a heat ray-shielding function, and (3) Method of producing a heat ray-shielding resin sheet material.

(1) Method of Producing Particles Having a Heat Ray-Shielding Function

The composite tungsten oxide particles expressed by a general formula $M_yWO_z$ can be obtained by applying heat treatment to a tungsten compound starting material in an inert gas atmosphere or a reducing gas atmosphere.

First, the tungsten compound starting material will be described.

As the tungsten compound starting material, any one of tungsten trioxide powder, tungsten dioxide powder, hydrate powder of the tungsten oxide, tungsten hexachloride, ammonium tungstate powder, hydrated tungsten oxide obtained by dissolving the tungsten hexachloride in alcohol, which is then dried, hydrate powder of the tungsten oxide obtained by dissolving the tungsten hexachloride in alcohol, and adding water so that the tungsten hexachloride is precipitated, which is then dried, tungsten compound powder obtained by drying the ammonium tungstate aqueous solution, and a metal tungsten powder, and element M or the element M in a form of a compound, can be given as preferable examples.

Here, in order to produce the starting material with uniform mixture of each component at a molecular level, each raw material is preferably mixed in a form of a solution. Therefore, the tungsten compound starting material containing element M is preferably dissolvable in a solvent such as water or an organic solvent. For example, tungstate, tungsten chloride salt, tungsten nitrate, tungsten sulfate, tungsten oxalate, tungsten oxide, tungsten carbonate, and tungsten hydroxide, etc., can be given if containing element M. However, the tungsten compound starting material is not limited thereto, and is preferable as long as it is in a solution form.

Heat treatment will be described next.

First, when heat treatment is applied in an inert gas atmosphere, a temperature condition is preferably set at 400° C. or more and 1200° C. or less. The starting material subjected to heat treatment at 400° C. or more and 1200° C. or less has a sufficient near infrared absorption force, and has excellent efficiency as the heat ray-shielding particle. Inert gas such as Ar and $N_2$, etc., may be used as the inert gas.

Further, when the heat treatment is applied in a reducing atmosphere, it is preferable that the heat treatment is applied to the starting material at a temperature of 100° C. or more and 400° C. or less in the reducing gas atmosphere first, and subsequently at 400° C. or more and 1200° C. or less in the inert gas atmosphere. Although the reducing gas used at this time is not particularly limited, $H_2$ is preferable. Then, when $H_2$ is used as the reducing gas, for example, $H_2$ is mixed into the inert gas such as Ar and $N_2$, etc., by a volume ratio of 0.1% or more and less than 100%, or $H_2$ gas itself is preferably used, and further preferably $H_2$ is mixed into the inert gas such as Ar and $N_2$, etc., by a volume ratio of 0.2% or more and less than 100%. Reduction can be efficiently advanced if $H_2$ is mixed by a volume ratio of 0.1% or more.

It is preferable that surface treatment is applied to the composite tungsten oxide particle of the present invention in such a manner that the particle is coated with a compound containing one or more kinds selected from Si, Ti, Zr, and Al, preferably it is coated with oxide, from a viewpoint of improving a weather resistance. In order to apply the surface treatment, a publicly-known surface treatment may be performed using an organic compound having one or more kinds selected from Si, Ti, Zr, and Al. For example, the composite tungsten oxide particles of the present invention and an organic silicon compound are mixed, and a hydrolysis treatment is applied to the mixture.

(2) Method of Producing a Dispersion Body Having a Heat Ray-Shielding Function

The composite tungsten oxide particles, the dispersant and optionally the solvent are mixed, to thereby obtain a dispersion liquid of the composite tungsten oxide particles using a general dispersion method. Specifically, dispersion methods such as a bead mill, a ball mill, a sand mill, and an ultrasonic dispersion, etc., can be used.

When the solvent is optionally added, an organic solvent having a boiling point of 120° C. or less is preferably added. If the boiling point is 120° C. or less, the solvent can be easily removed by a drying step, particularly by drying under reduced pressure, which is a post-process. Specifically, toluene, methyl ethyl ketone, methyl isobutyl ketone, butyl acetate, isopropyl alcohol, and ethanol can be given. However, the dispersant can be arbitrarily selected as long as it has a boiling point of 120° C. or less and it can uniformly disperse the composite tungsten oxide particles.

By vacuum-drying the obtained dispersion liquid, the heat ray-shielding dispersion body can be obtained. If the organic solvent having the boiling point of 120° C. is used, removal the solvent is speedily advanced in the vacuum drying step, and the productivity of the composite tungsten oxide particle-containing composition is improved. Further, since the vacuum drying step is easily and sufficiently advanced, an excessive organic solvent is not allowed to remain in the composite tungsten oxide particle-containing composition of the present invention. As a result, occurrence of a trouble such as generation of bubbles at the time of forming the heat ray-shielding resin sheet material, can be prevented.

(3) Method of Producing a Heat Ray-Shielding Resin Sheet Material

The obtained heat ray-shielding dispersion body, the selected wavelength absorbing material, and the thermoplastic resin are kneaded, and thereafter the kneaded material is molded into a flat or a curved sheet material for example, by a publicly-known method such as an extrusion molding or an injection molding, to thereby produce the heat ray-shielding resin sheet material.

The heat ray-shielding resin sheet material can also be produced by uniformly dispersing the composite tungsten oxide particle dispersion body and the selected wavelength absorbing material into the thermoplastic resin, and pelletizing this mixture by a granulator once, and thereafter applying the publicly-known method such as extrusion molding and injection molding to this pelletized mixture.

A thickness of the heat ray-shielding resin sheet material can be adjusted to an arbitrary thickness as needed, from a thick plate shape to a thin film shape.

The heat ray-shielding resin sheet material of the present invention can be used as it is as the heat ray-shielding transparent base material. On the other hand, the heat ray-shielding resin sheet material of the present invention can also be used in combination with a transparent base material such as a glass, etc., as the film shape or the plate shape.

Also, a hard coat layer having a scratch resistance may be formed on at least one sheet material surface of the heat ray-shielding resin sheet material. For example, a silicate-based or acrylic hard coat layer having a scratch resistance property can be formed on the heat ray-shielding resin sheet material. By forming the scratch resistance hard coat layer, the scratch resistance of the heat ray-shielding resin sheet material can be improved. The heat ray-shielding resin sheet material having improved scratch resistance can be applied to the window materials of the automobiles and buildings.

[3] Heat-Shielding Performance of a Heat Ray-Shielding Resin Sheet Material

Heat-shielding performance of the heat ray-shielding resin sheet material of the present invention is expressed by the solar transmittance to the visible light transmittance. As the solar transmittance to the visible light transmittance is lower, the heat ray-shielding resin sheet material having excellent heat-shielding performance can be obtained. Specifically, when the visible light transmittance is 70%, the solar transmittance is preferably 32.5% or less, and more preferably 31% or less.

As described above, the heat ray-shielding resin sheet material of the present invention has a lower solar transmittance than the visible light transmittance. Therefore, by mounting the heat ray-shielding resin sheet material of the present invention on an automobile roof and side windows, etc., as the window material, power consumption of an air conditioner can be more reduced than a case of mounting a normal glass. As a result, in the automobiles using batteries particularly like hybrid cars and electric vehicles, a significant effect of extending a traveling range, etc., can be exhibited, because the power consumption of the batteries can be suppressed. Accordingly, improved fuel economy of automobiles can be expected, which contributes to reducing greenhouse gas emissions, and therefore the heat ray-shielding resin sheet material of the present invention is expected to be an essential member in the future, in designing the automobiles.

EXAMPLES

The present invention will be more specifically described hereafter, with reference to examples. However, the present invention is not limited to the following examples.

Here, examples 1 to 23 and comparative examples 1 to 3 are related to the heat ray-shielding film, and examples 24 to 46 and comparative examples 4 to 6 are related to the heat ray-shielding resin sheet material.

The transmittance of a light of a wavelength of 420 nm, a wavelength of 460 nm and a wavelength of 550 nm through the selected wavelength absorbing material in each example, was measured by putting a liquid in which a suitable concentration of the selected wavelength absorbing material was dissolved, in a quartz glass cell having an optical path length of 1 cm, using a spectrophotometer U-4000 manufactured by Hitachi Corporation. A baseline was drawn in a state of putting only the organic solvent used for dissolving in the same cell. The organic solvent dissolving the selected wavelength absorbing material therein, was used by arbitrarily selecting one kind from toluene, methyl isobutyl ketone, and N-methyl-2-pyrrolidinone, in accordance with a dissolving performance of the selected wavelength absorbing material in the solvent.

The visible light transmittance and the solar transmittance of the heat ray-shielding laminated transparent base material, was calculated based on JIS R 3106, from the transmittance of a light of a wavelength of 300 to 2100 nm measured using the spectrophotometer U-4000. Note that the solar transmittance is an index showing the heat-shielding performance of the heat ray-shielding laminated transparent base material. If the solar transmittance is lower when the visible light transmittance is approximately constant, it can be said that the heat-shielding performance is higher. This time, the visible light transmittance was standardized in a range of 70.0 to 70.5%, and a level of the solar transmittance at this time was used as a criterion for judging a superiority of the heat-shielding performance.

On the other hand, YI of the heat ray-shielding laminated transparent base material was calculated based on JIS Z 8701 and JIS K 7373, from the transmittance of a light of a wavelength of 380 to 780 nm measured using the spectrophotometer U-4000.

Example 1

Composite tungsten oxide particles $Cs_{0.33}WO_3$ (descried as particle a hereafter) 20 mass %, and an acrylic dispersant having a group containing amine as a functional group (having amine value of 48 mgKOH/g, and a decomposition temperature of 250° C.) 10 mass %, and triethylene glycol di-2-ethyl hexanoate (described as a plasticizer a hereafter) 70 mass % were weighed. They were loaded into a paint shaker in which 0.3 mmφ$ZrO_2$ beads were put, and were subjected to pulverization/dispersion treatment for 10 hours, to thereby obtain a plasticizer dispersion liquid of particle a (described as particle dispersion liquid A hereafter).

Wherein, a dispersed particle size of the composite tungsten oxide particle in the particle dispersion liquid A was 21 nm when measuring it by a Micro track particle size distribution analyzer manufactured by Nikkiso.

Prescribed amounts of particle dispersion liquid A, and a benzotriazole compound expressed by a [Chemical formula 6] as a selected wavelength absorbing material (transmittance was 0% at a wavelength of 420 nm when a transmittance of a light of a wavelength of 550 nm was 99%, and when a transmittance of a light of a wavelength of 460 nm was 90%), were added to a mixture obtained by mixing 38 mass % plasticizer into polyvinyl butyral resin, so that a content of the selected wavelength absorbing material was 0.05 mass %, and the visible light transmittance was 70.0 to 70.5% in a case of a laminated transparent base material, to thereby prepare a composition for producing a heat ray-shielding film.

The composition for producing the heat ray-shielding resin film was kneaded by a twin-screw extruder at 200° C., and extruded by a T die, to thereby obtain the heat ray-shielding film of example 1, as a sheet having a thickness of 1.0 mm by an extrusion calender roll method.

[Chemical formula 6]

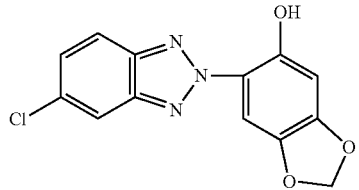

The obtained heat ray-shielding film of example 1 was interposed between two opposing clear glasses having a thickness of 3 mm, which was then integrally laminated by a publicly-known method, to thereby obtain a heat ray-shielding laminated transparent base material of example 1.

As an optical performance of the heat ray-shielding laminated transparent base material of example 1, the solar transmittance was 29.3% when the visible light transmittance was 70.0%, and YI was 4.5. Further, when a weather resistance test was performed to the heat ray-shielding laminated transparent base material, color change ΔE was 2.9. Table 2 shows these results.

Examples 2 to 16

A heat ray-shielding laminated transparent base material of examples 2 to 16 was obtained similarly to example 1, excluding a point that the kind of the selected wavelength absorbing material and the content of the selected wavelength absorbing material were changed in the composition for producing the heat ray-shielding resin film as shown in table 2. Then, the optical performance of the heat ray-shielding laminated transparent base material of examples 2 to 16 and the color change ΔE during the weather resistance test were measured similarly to example 1. Table 2 shows a measurement result of the optical performance of the heat ray-shielding laminated transparent base material of examples 2 to 16, and the color change ΔE during the weather resistance test.

In examples 2 to 3, the benzotriazole compound expressed by the [Chemical formula 6] was used as the selected wavelength absorbing material.

[Chemical formula 6]

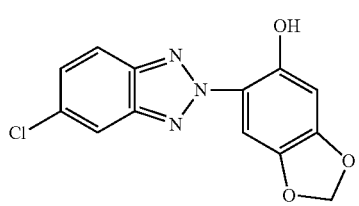

In examples 4 to 6, the benzotriazole compound expressed by [Chemical formula 7] was used, wherein the transmittance at a wavelength of 420 nm was 0% when the transmittance of the light of a wavelength of 550 nm was 99%, and the transmittance of the light of a wavelength of 460 nm was 90%.

[Chemical formula 7]

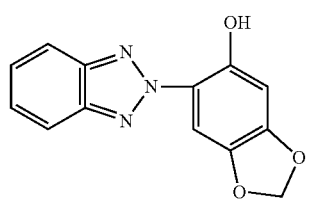

In examples 7 to 9, the benzotriazole compound expressed by [Chemical formula 8] was used, wherein the transmittance at a wavelength of 420 nm was 0% when the transmittance of the light of a wavelength of 550 nm was 99%, and the transmittance of the light of a wavelength of 460 nm was 90%.

[Chemical formula 8]

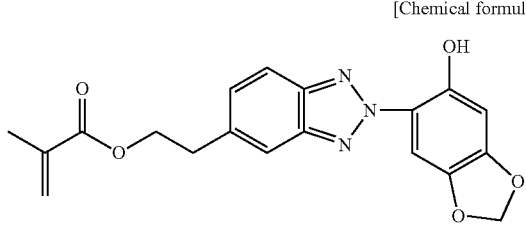

In example 10, the benzotriazole compound expressed by [Chemical formula 9] was used, wherein the transmittance at a wavelength of 420 nm was 0% when the transmittance of the light of a wavelength of 550 nm was 99%, and the transmittance of the light of a wavelength of 460 nm was 90%.

[Chemical formula 9]

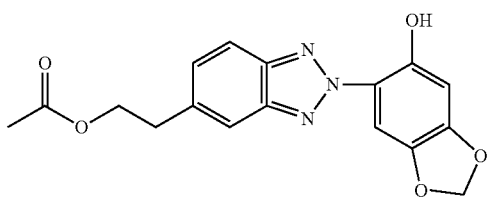

In example 11, the benzotriazole compound expressed by [Chemical formula 10] was used, wherein the transmittance at a wavelength of 420 nm was 0% when the transmittance of the light of a wavelength of 550 nm was 99%, and the transmittance of the light of a wavelength of 460 nm was 90%.

[Chemical formula 10]

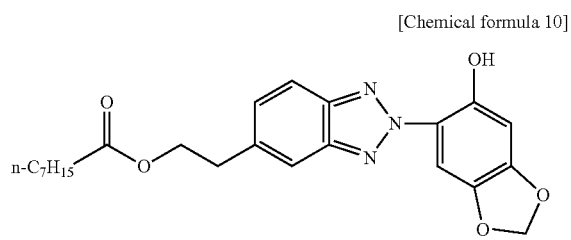

In examples 12 to 14, BONASORB UA-3911 (CAS No. 142676-93-5) by Orient Chemical Industries Co., Ltd, which was an indole compound expressed by [Chemical formula 12] was used, wherein the transmittance at a wavelength of 420 nm was 0% when the transmittance of the light of a wavelength of 550 nm was 99%, and the transmittance of the light of a wavelength of 460 nm was 90%.

[Chemical formula 12]

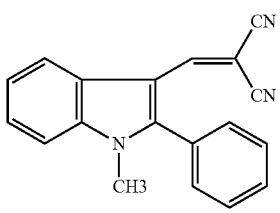

In example 15, BONASORB UA-3701 (CAS No. 55567-59-4) by Orient Chemical Industries Co., Ltd, which was an azomethine compound expressed by [Chemical formula 13] was used, wherein the transmittance at a wavelength of 420 nm was 0% when the transmittance of the light of a wavelength of 550 nm was 98%, and the transmittance of the light of a wavelength of 460 nm was 90%.

[Chemical formula 13]

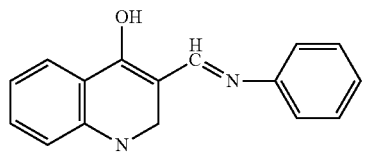

In example 16, DAINSORB P-6 (CAS No. 131-55-4) by Daiwa Kasei Co., Ltd. which was a benzophenon compound expressed by [Chemical formula 14] was used, wherein the transmittance at a wavelength of 420 nm was 25% when the transmittance of the light of a wavelength of 550 nm was 97%, and the transmittance of the light of a wavelength of 460 nm was 92%.

[Chemical formula 14]

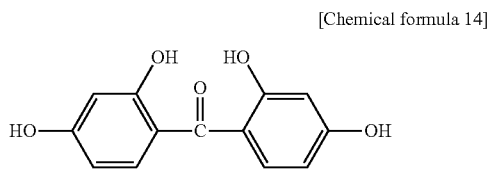 [SMILES: O=C(c1ccc(O)cc1O)c1ccc(O)cc1O]

Example 17

A heat ray-shielding laminated transparent base material of examples 17 was obtained similarly to example 1, excluding a point that the benzotriazole compound expressed by [Chemical formula 15] was added to the composition for producing the heat ray-shielding resin film as a ultraviolet absorber, so that the content of the ultraviolet absorber in the composition for producing the heat ray-shielding resin film was 0.3 mass %. Then, the optical performance of the heat ray-shielding laminated transparent base material of example 17 and the color change ΔE during the weather resistance test were measured similarly to example 1. Table 2 shows the measurement result of the optical performance of the heat ray-shielding laminated transparent base material of example 17, and the color change ΔE during the weather resistance test.

Examples 18 to 19

The heat ray-shielding laminated transparent base material of examples 18 and 19 was obtained similarly to example 17, excluding a point that the kind of the selected wavelength absorbing material, the content of the selected wavelength absorbing material in the composition for producing the heat ray-shielding resin film, the kind of the ultraviolet absorber, and the content of the ultraviolet absorber in the composition for producing the heat ray-shielding resin film, were changed as shown in table 2. Then, the optical performance of the heat ray-shielding laminated transparent base material of examples 18 and 19, and the color change ΔE during the weather resistance test were measured similarly to example 1. Table 2 shows the measurement result of the optical performance of the heat ray-shielding laminated transparent base material of examples 18 and 19, and the color change \E during the weather resistance test.

In example 18, the benzotriazole compound expressed by [Chemical formula 6] was used as the selected wavelength absorbing material, and the benzotriazole compound expressed by [Chemical formula 16] was used as the ultraviolet absorber.

[Chemical formula 6]

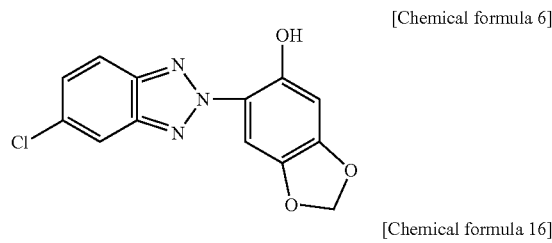

[Chemical formula 16]

In example 19, the indole compound expressed by [Chemical formula 12] was used as the selected wavelength absorbing material, and the benzotriazole compound expressed by [Chemical formula 15] was used as the ultraviolet absorber.

[Chemical formula 12]

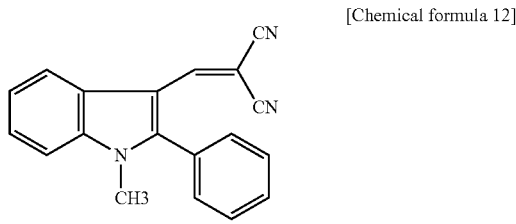

[Chemical formula 15]

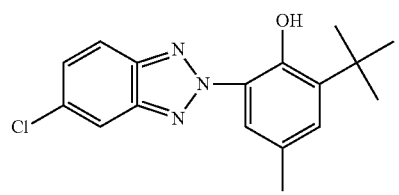

Example 20

The heat ray-shielding laminated transparent base material of example 20 was obtained similarly to example 17, excluding a point that 2-ethyl butyric acid magnesium was further added to the composition for producing the heat ray-shielding resin film as a polyvalent metal salt so that the content of the polyvalent metal salt in the composition for producing the neat ray-shielding film was 0.04%. Then, the optical performance of the heat ray-shielding laminated transparent base material of example 17, and the color change ΔE during the weather resistance test were measured similarly to example 1. Table 2 shows the measurement result of the optical performance of the heat ray-shielding laminated transparent base material of example 20, and the color change ΔE during the weather resistance test.

Comparative Example 1

The heat ray-shielding laminated transparent base material of comparative example 1 was obtained similarly to example 1, excluding a point that the selected wavelength absorbing material was not added. Then, the optical performance of the heat ray-shielding laminated transparent base material of comparative example 1, and the color change ΔE during the weather resistance test were measured similarly to example 1. Table 2 shows the measurement result of the optical performance of the heat ray-shielding laminated transparent base material of comparative example 1, and the color change ΔE during the weather resistance test.

Comparative Example 2

The heat ray-shielding laminated transparent base material of comparative example 2 was obtained similarly to example 1, excluding a point that the content of the selected wavelength absorbing material in the composition for producing the heat ray-shielding resin film was set to 0.005 mass %. Then, the optical performance of the heat ray-shielding laminated transparent base material of comparative example 2, and the color change ΔE during the weather resistance test were measured similarly to example 1. Table 2 shows the measurement result of the optical performance of the heat ray-shielding laminated transparent base material of comparative example 2, and the color change ΔE during the weather resistance test.

Comparative Example 3

The heat ray-shielding laminated transparent base material of comparative example 3 was obtained similarly to example 1, excluding a point that a quinophthalone compound (C.I. Solvent Yellow 33, CAS No. 8003-22-3) expressed by [Chemical formula 17] was used as the selected wavelength absorbing material wherein the transmittance at a wavelength of 420 nm was 55% when the transmittance of a light of a wavelength of 550 nm was 99%, and the transmittance of a light of a wavelength of 460 nm was 90%, and the content of the selected wavelength absorbing material was set to 0.01 mass % in the composition for producing the heat ray-shielding resin film. Then, the optical performance of the heat ray-shielding laminated transparent base material of comparative example 3, and the color change ΔE during the weather resistance test were measured similarly to example 1. Table 2 shows the measurement result of the optical performance of the heat ray-shielding laminated transparent base material of comparative example 3, and the color change ΔE during the weather resistance test.

[Chemical formula 17]

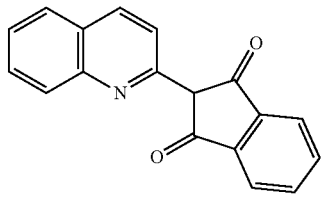

Example 21

Composite tungsten oxide particles $Rb_{0.33}WO_3$ (descried as particle b hereafter) 20 mass %, a dispersant a 10 mass %, and a plasticizer a 70 mass % were weighed. They were loaded into a paint shaker in which 0.3 mmφ$ZrO_2$ beads were put, and were subjected to pulverization/dispersion treatment for 10 hours, to thereby obtain a plasticizer dispersion liquid of particle b (described as particle dispersion liquid B hereafter).

Wherein, a dispersed particle size of the composite tungsten oxide particle in the particle dispersion liquid A was 27 nm when measuring it by a Micro track particle size distribution analyzer manufactured by Nikkiso.

The heat ray-shielding laminated transparent base material of example 21 was obtained similarly to example 1, excluding a point that the particle dispersion liquid B was used instead of the particle dispersion liquid A. Then, the optical performance of the heat ray-shielding laminated transparent base material of example 21 and the color change ΔE during the weather resistance test were measured similarly to example 1. Table 2 shows the measurement result of the optical performance of the heat ray-shielding laminated transparent base material of example 21, and the color change ΔE during the weather resistance test.

Example 22

Particle a 20 mass %, dispersant a 10 mass %, and toluene 70 mass % were weighed. They were loaded into a paint shaker in which 0.3 mmφ$ZrO_2$ beads were put, and were subjected to pulverization/dispersion treatment for 10 hours, to thereby obtain a dispersion liquid of the composite tungsten oxide particles (abbreviated as particle dispersion liquid C hereafter).

Wherein, a dispersed particle size of the composite tungsten oxide particle in the particle dispersion liquid C was 24 nm when measuring it by a Micro track particle size distribution analyzer manufactured by Nikkiso.

Dispersant a was further added to the dispersion liquid C, and the liquid was adjusted so that a weight ratio of the dispersant a to the composite tungsten oxide particles [dispersant a/composite tungsten oxide particles]=3. Next, toluene was removed from this particle dispersion liquid C using a spray drier, to thereby obtain a composite tungsten oxide particle powder (abbreviated as dispersion powder C hereafter).

A prescribed amount of dispersion powder A and the benzotriazole compound expressed by [Chemical formula 6] which was the selected wavelength absorbing material, were added to ethylene-vinyl acetate copolymer which was a thermoplastic resin, so that the content of the selected wavelength absorbing material in the composition for producing the heat ray-shielding resin film was 0.05 mass % and the visible light transmittance was 70.0 to 70.5% when a laminated transparent base material was used, to thereby prepare the composition for producing the heat ray-shielding resin film. Note that the plasticizer was not added to the composition for producing the heat ray-shielding resin film.

[Chemical formula 6]

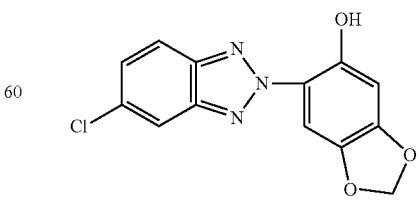

The composition for producing the heat ray-shielding resin film was kneaded by a twin-screw extruder at 220° C., and extruded by a T die, to thereby obtain the heat ray-shielding film of example 22, as a sheet having a thickness of 1.0 mm by an extrusion calender roll method.

The obtained heat ray-shielding film of example 22 was interposed between two opposing clear glasses having a thickness of 3 mm, which was then integrally laminated by a publicly-known method, to thereby obtain a heat ray-shielding laminated transparent base material of example 22.

Then, the optical performance of the heat ray-shielding laminated transparent base material of example 22 and the color change ΔE during the weather resistance test were measured similarly to example 1. Table 2 shows the measurement result of the optical performance of the heat ray-shielding laminated transparent base material of example 22, and the color change ΔE during the weather resistance test.

Example 23

The heat ray-shielding laminated transparent base material of example 23 was obtained similarly to example 1, excluding a point that two opposing green glasses having a thickness of 2 mm was used as the transparent base materials for interposing the heat ray-shielding film between them. Then, the optical performance of the heat ray-shielding laminated transparent base material of example 23 and the color change ΔE during the weather resistance test were measured similarly to example 1. Table 2 shows the measurement result of the optical performance of the heat ray-shielding laminated transparent base material of example 23, and the color change ΔE during the weather resistance test.

TABLE 1

| Chemical formula of selected wavelength absorbing material | Transmittance (%) at wavelength 420 nm when transmittance at wavelength 550 nm and 460 nm is 90% or more |
|---|---|
| Chemical formula 6 | 0 |
| Chemical formula 7 | 0 |
| Chemical formula 8 | 0 |
| Chemical formula 9 | 0 |
| Chemical formula 10 | 0 |
| Chemical formula 12 | 0 |
| Chemical formula 13 | 0 |
| Chemical formula 14 | 25 |
| Chemical formula 17 | 55 |

Table 1 shows the transmittance of the light of a wavelength of 420 nm when the transmittance of the lights of a wavelength of 550 nm and a wavelength of 460 nm was set to 90% or more, in the selected wavelength absorbing material itself excluding absorption of the medium or the base material.

The transmittance of the light of a wavelength of 420 nm through the benzotriazole compound expressed by [Chemical formula 6], [Chemical formula 7], [Chemical formula 8], [Chemical formula 9], and [Chemical formula 10] used in examples 1 to 23, the indole compound expressed by [Chemical formula 12], the azomethine compound expressed by [Chemical formula 13], and the benzophenone compound expressed by [Chemical formula 14], was 40% or less, but the transmittance of the light of a wavelength of 420 nm through the quinophthalone compound expressed by [Chemical formula 17] used in comparative example 3, was higher than 40%.

TABLE 2

| | Mixture of materials | | | | | | |
|---|---|---|---|---|---|---|---|
| | Composite tungsten oxide particle | Selected wavelength absorbing material | | Ultraviolet absorber | | Polyvalent metal salt | |
| | Kind | Kind | Content*1 (Mass %) | Kind | Content*1 (Mass %) | Kind | Content*1 (Mass %) |
| Example 1 | $Cs_{0.33}WO_3$ | Chemical formula 6 | 0.05 | — | — | — | — |
| Example 2 | $Cs_{0.33}WO_3$ | Chemical formula 6 | 0.10 | — | — | — | — |
| Example 3 | $Cs_{0.33}WO_3$ | Chemical formula 6 | 0.02 | — | — | — | — |
| Example 4 | $Cs_{0.33}WO_3$ | Chemical formula 7 | 0.30 | — | — | — | — |
| Example 5 | $Cs_{0.33}WO_3$ | Chemical formula 7 | 0.15 | — | — | — | — |
| Example 6 | $Cs_{0.33}WO_3$ | Chemical formula 7 | 0.05 | — | — | — | — |
| Example 7 | $Cs_{0.33}WO_3$ | Chemical formula 8 | 0.35 | — | — | — | — |
| Example 8 | $Cs_{0.33}WO_3$ | Chemical formula 8 | 0.15 | — | — | — | — |
| Example 9 | $Cs_{0.33}WO_3$ | Chemical formula 8 | 0.05 | — | — | — | — |
| Example 10 | $Cs_{0.33}WO_3$ | Chemical formula 9 | 0.15 | — | — | — | — |
| Example 11 | $Cs_{0.33}WO_3$ | Chemical formula 10 | 0.15 | — | — | — | — |
| Example 12 | $Cs_{0.33}WO_3$ | Chemical formula 12 | 0.05 | — | — | — | — |
| Example 13 | $Cs_{0.33}WO_3$ | Chemical formula 12 | 0.1 | — | — | — | — |
| Example 14 | $Cs_{0.33}WO_3$ | Chemical formula 12 | 0.02 | — | — | — | — |
| Example 15 | $Cs_{0.33}WO_3$ | Chemical formula 13 | 0.05 | — | — | — | — |
| Example 16 | $Cs_{0.33}WO_3$ | Chemical formula 14 | 1.8 | — | — | — | — |
| Example 17 | $Cs_{0.33}WO_3$ | Chemical formula 6 | 0.05 | Chemical formula 15 | 0.3 | — | — |
| Example 18 | $Cs_{0.33}WO_3$ | Chemical formula 6 | 0.05 | Chemical formula 16 | 1.0 | — | — |
| Example 19 | $Cs_{0.33}WO_3$ | Chemical formula 12 | 0.05 | Chemical formula 15 | 0.3 | — | — |
| Example 20 | $Cs_{0.33}WO_3$ | Chemical formula 6 | 0.05 | Chemical formula 15 | 0.3 | 2-ehtyl butyrate magnesium | 0.04 |
| Example 21 | $Rb_{0.33}WO_3$ | Chemical formula 6 | 0.05 | — | — | — | — |
| Example 22 | $Cs_{0.33}WO_3$ | Chemical formula 6 | 0.05 | — | — | — | — |
| Example 23 | $Cs_{0.33}WO_3$ | Chemical formula 6 | 0.05 | — | — | — | — |
| Comparative example 1 | $Cs_{0.33}WO_3$ | — | — | — | — | — | — |
| Comparative example 2 | $Cs_{0.33}WO_3$ | Chemical formula 6 | 0.005 | — | — | — | — |
| Comparative example 3 | $Cs_{0.33}WO_3$ | Chemical formula 17 | 0.01 | — | — | — | — |

TABLE 2-continued

|  | Thermoplastic transparent base material (heat ray-shielding film base material) Material | Transparent base material Material | Initial performance | | | Weather resistance |
|---|---|---|---|---|---|---|
|  |  |  | Visible light transmittance (%) | Solar transmittance (%) | Yellowness index (YI) | ΔE after 200 h |
| Example 1 | Polyvinyl butyral | Clear glass | 70.0 | 29.3 | 4.5 | 2.9 |
| Example 2 | Polyvinyl butyral | Clear glass | 70.3 | 28.8 | 9.1 | 3.0 |
| Example 3 | Polyvinyl butyral | Clear glass | 70.1 | 30.3 | 1.0 | 3.3 |
| Example 4 | Polyvinyl butyral | Clear glass | 70.5 | 30.0 | 7.6 | 2.7 |
| Example 5 | Polyvinyl butyral | Clear glass | 70.1 | 29.5 | 3.2 | 3.0 |
| Example 6 | Polyvinyl butyral | Clear glass | 70.2 | 31.0 | 1.5 | 3.3 |
| Example 7 | Polyvinyl butyral | Clear glass | 70.0 | 29.1 | 9.8 | 2.5 |
| Example 8 | Polyvinyl butyral | Clear glass | 70.4 | 30.5 | 4.7 | 2.6 |
| Example 9 | Polyvinyl butyral | Clear glass | 70.0 | 31.1 | 0.0 | 3.1 |
| Example 10 | Polyvinyl butyral | Clear glass | 70.5 | 30.7 | 3.4 | 2.0 |
| Example 11 | Polyvinyl butyral | Clear glass | 70.4 | 30.6 | 4.9 | 2.3 |
| Example 12 | Polyvinyl butyral | Clear glass | 70.2 | 30.2 | 4.4 | 7.4 |
| Example 13 | Polyvinyl butyral | Clear glass | 70.5 | 28.7 | 9.6 | 8.3 |
| Example 14 | Polyvinyl butyral | Clear glass | 70.5 | 30.2 | 1.5 | 9.0 |
| Example 15 | Polyvinyl butyral | Clear glass | 70.1 | 28.8 | 3.7 | 7.3 |
| Example 16 | Polyvinyl butyral | Clear glass | 70.3 | 30.4 | 4.4 | 8.8 |
| Example 17 | Polyvinyl butyral | Clear glass | 70.2 | 28.9 | 5.0 | 1.4 |
| Example 18 | Polyvinyl butyral | Clear glass | 70.2 | 28.7 | 7.3 | 1.4 |
| Example 19 | Polyvinyl butyral | Clear glass | 70.0 | 29.5 | 7.1 | 1.9 |
| Example 20 | Polyvinyl butyral | Clear glass | 70.3 | 28.8 | 5.2 | 0.7 |
| Example 21 | Polyvinyl butyral | Clear glass | 70.4 | 30.1 | 4.3 | 3.5 |
| Example 22 | Ethylene-vinyl acetate copolymer | Clear glass | 70.4 | 29.9 | 4.9 | 4.5 |
| Example 23 | Polyvinyl butyral | Green glass | 70.4 | 30.7 | −2.0 | 2.4 |
| Comparative example 1 | Polyvinyl butyral | Clear glass | 70.1 | 33.2 | −3.7 | 8.1 |
| Comparative example 2 | Polyvinyl butyral | Clear glass | 70.2 | 33.0 | −3.2 | 7.2 |
| Comparative example 3 | Polyvinyl butyral | Clear glass | 70.3 | 29.7 | 57.9 | 4.9 |

Content*1: content in the heat-ray shielding film

Evaluation of Examples 1 to 23 and Comparative Examples 1 to 3

In examples 1 to 23, a lower solar transmittance than comparative example 1 could be obtained by providing a coexistence state of the selective wavelength absorbing material and the composite tungsten oxide particles at a suitable ratio, wherein the selective wavelength absorbing material didn't coexist in comparative example 1. Further, YI of the heat ray-shielding laminated transparent material didn't exceed 10, and there was little change of the color tone due to coexistence of the selective wavelength absorbing material.

Especially in examples 1 to 11, examples 17 to 18, and examples 20 to 23, degradation of the selective wavelength absorbing material during the weather resistance test was suppressed and there was further little change of the color tone, by using the benzotriazole compound having high weather resistance as the selected wavelength absorbing material.

Further, in examples 17 to 20, by further providing a coexistence state of the ultraviolet absorber, a lower solar transmittance could be obtained than the solar transmittance at the time of providing the coexistence state of the selected wavelength absorbing material only and the composite tungsten oxide particles, and there was further little change of the color tone during the weather resistance test. Especially, in example 20 in which the polyvalent metal salt was used in combination, the change of the color tone of the laminated transparent base material was further suppressed before/after the weather resistance test.

On the other hand, in comparative example 1, the selected wavelength absorbing material didn't coexist, and therefore the solar transmittance was remained to be 33% or more when the visible light transmittance was 70%. Further, since no one of the ultraviolet absorber, the polyvalent metal salt, and the selected wavelength absorbing material was contained, coloring of the composite tungsten oxide occurred significantly due to ultraviolet ray, and there was a great change of the color tone during the weather resistance test. In comparative example 2, the addition amount of the selected wavelength absorbing material was small, and therefore a sufficient absorption could not be obtained, and only the solar transmittance of the same degree as comparative example 1 could be obtained, wherein the selected wavelength absorbing material didn't coexist in comparative example 1. In comparative example 3, the quinophthalone compound having a weak absorption force for the light of a wavelength of 420 nm was used as the selected wavelength absorbing material, with respect to the transmittance of the lights of a wavelength of 550 nm and a wavelength of 460 nm, and therefore YI was raised to 10 or more, resulting in a great change of the color tone of the heat ray-shielding laminated transparent base material.

Example 24

Particle a 20 mass %, dispersant a 10 mass %, and toluene 70 mass % were weighed. They were loaded into the paint shaker in which 0.3 mmφZrO$_2$ beads were put, and were subjected to pulverization/dispersion treatment for 10 hours, to thereby obtain particle dispersion liquid A.

Wherein, a dispersed particle size of the composite tungsten oxide particle in the particle dispersion liquid A was 24 nm when measuring it by a Micro track particle size distribution analyzer manufactured by Nikkiso.

Dispersant a was further added to the dispersion liquid A, and the liquid was adjusted so that a weight ratio of the dispersant a to the composite tungsten oxide particles [dispersant a/composite tungsten oxide particles]=3. Next, toluene was removed from this particle dispersion liquid A using a spray drier, to thereby obtain a composite tungsten oxide particle powder (abbreviated as dispersion powder A hereafter).

A prescribed amount of dispersion powder A and the benzotriazole compound expressed by [Chemical formula 6] which was the selected wavelength absorbing material wherein the transmittance at the wavelength of 420 nm was 0% when the transmittance of the light of the wavelength of 550 nm was 99% and the transmittance of the light of the wavelength of 460 nm was 90%, were added to polycarbonate resin which was a thermoplastic resin, so that the content of the selected wavelength absorbing material in the composition for producing the heat ray-shielding resin sheet was 0.05 mass % and the visible light transmittance was 70.0 to 70.5% when a heat ray-shielding resin sheet material was used, to thereby prepare the composition for producing the heat ray-shielding resin sheet material.

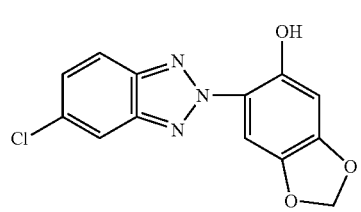

[Chemical formula 6]

The composition for producing the heat ray-shielding resin sheet was kneaded by a twin-screw extruder at 280° C., and extruded by a T die, to thereby obtain the heat ray-shielding resin sheet material of example 24, as a sheet having a thickness of 1.0 mm by an extrusion calender roll method.

As the optical performance of the obtained heat ray-shielding resin sheet material of example 24, the solar transmittance was 29.5% and YI was 4.7 when the visible light transmittance was 70.1%. Table 3 shows this result.

Examples 25 to 39

The heat ray-shielding resin sheet material of examples 25 to 39 was obtained similarly to example 24, excluding a point that the kind of the selected wavelength absorbing material and the content of the selected wavelength absorbing material in the composition for producing the heat ray-shielding film described in example 24, were changed as shown in table 3. Then, the optical performance of the heat ray-shielding resin sheet material of examples 25 to 39 were measured similarly to example 24. Table 3 shows the measurement result of the optical performance of the heat ray-shielding resin sheet material of examples 25 to 39.

In examples 25 to 26, the benzotriazole compound expressed by the [Chemical formula 6] was used as the selected wavelength absorbing material.

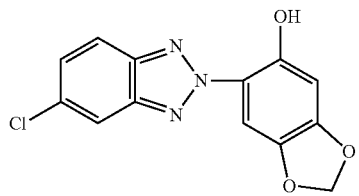

[Chemical formula 6]

In examples 27 to 29, the benzotriazole compound expressed by [Chemical formula 7] was used, wherein the transmittance at the wavelength of 420 nm was 0% when the transmittance of the light of the wavelength of 550 nm was 99% and the transmittance of the light of the wavelength of 460 nm was 90%.

[Chemical formula 7]

In examples 30 to 32, the benzotriazole compound expressed by [Chemical formula 8] was used, wherein the transmittance at the wavelength of 420 nm was 0% when the transmittance of the light of the wavelength of 550 nm was 99% and the transmittance of the light of the wavelength of 460 nm was 90%.

[Chemical formula 8]

In example 33, the benzotriazole compound expressed by [Chemical formula 9] was used, wherein the transmittance at the wavelength of 420 nm was 0% when the transmittance of the light of the wavelength of 550 nm was 99% and the transmittance of the light of the wavelength of 460 nm was 90%.

[Chemical formula 9]

In example 34, the benzotriazole compound expressed by [Chemical formula 10] was used, wherein the transmittance at the wavelength of 420 nm was 0% when the transmittance of the light of the wavelength of 550 nm was 99% and the transmittance of the light of the wavelength of 460 nm was 90%.

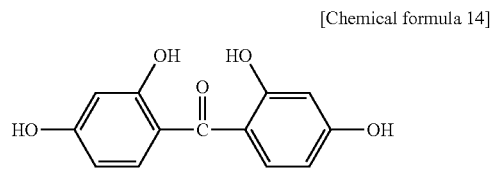

[Chemical formula 14]

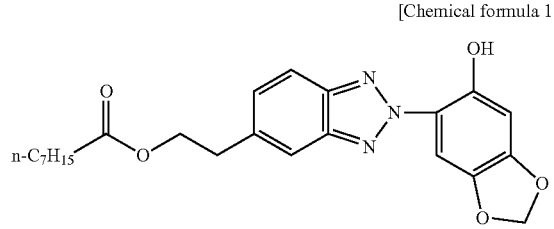

[Chemical formula 10]

In examples 35 to 37, BONASORB UA-3911 (CAS No. 142676-93-5) by Orient Chemical Industries Co., Ltd, which was an indole compound expressed by [Chemical formula 12] was used, wherein the transmittance at a wavelength of 420 nm was 0% when the transmittance of the light of a wavelength of 550 nm was 99%, and the transmittance of the light of a wavelength of 460 nm was 90%.

Example 40

The heat ray-shielding resin sheet material of example 40 was obtained similarly to example 24, excluding a point that the benzotriazole compound expressed by [Chemical formula 15] was added to the composition for producing the heat ray-shielding film as a ultraviolet absorber, so that the content of the ultraviolet absorber in the composition for producing the heat ray-shielding film was 0.3 mass %. Then, the optical performance of the heat ray-shielding resin sheet material of example 40 was measured similarly to example 24. Table 3 shows the measurement result of the optical performance of the heat ray-shielding resin sheet material of example 40.

Examples 41 and 42

The heat ray-shielding resin sheet material of examples 41 and 42 was obtained similarly to example 40, excluding a point that the kind of the selected wavelength absorbing material, the content of the selected wavelength absorbing material in the composition for producing the heat ray-shielding film, the kind of the ultraviolet absorber, and the content of the ultraviolet absorber in the composition for producing the heat ray-shielding film, were changed as shown in table 3. Then, the optical performance of the heat ray-shielding resin sheet material of examples 41 and 42, was measured similarly to example 24. Table 3 shows the measurement result of the optical performance of the heat ray-shielding resin sheet material of examples 41 and 42.

In example 41, the benzotriazole compound expressed by the [Chemical formula 6] was used as the selected wavelength absorbing material, and the benzotriazole compound expressed by [Chemical formula 16] was used as the ultraviolet absorber.

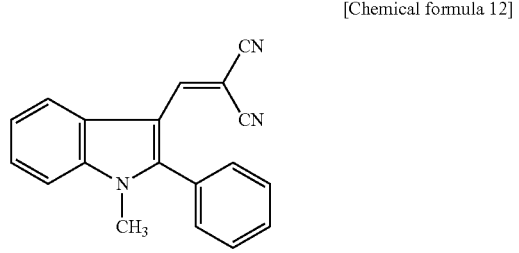

[Chemical formula 12]

In example 38, BONASORB UA-3701 (CAS No. 55567-59-4) by Orient Chemical Industries Co., Ltd, which was an azomethine compound expressed by [Chemical formula 13] was used, wherein the transmittance at a wavelength of 420 nm was 0% when the transmittance of the light of a wavelength of 550 nm was 98%, and the transmittance of the light of a wavelength of 460 nm was 90%.

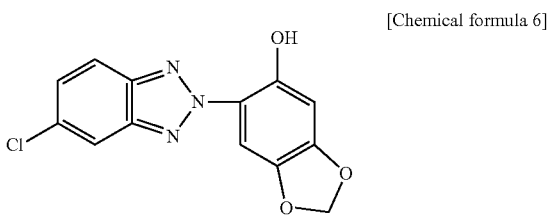

[Chemical formula 6]

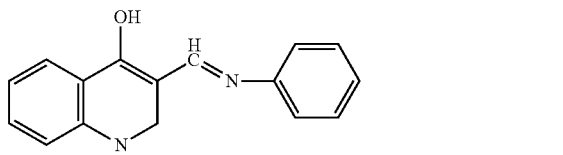

[Chemical formula 13]

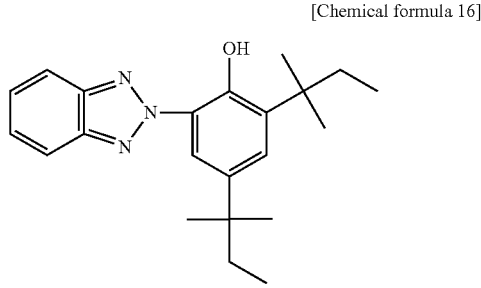

[Chemical formula 16]

In example 39, DAINSORB P-6 (CAS No. 131-55-4) by Daiwa Kasei Co., Ltd. which was a benzophenon compound expressed by [Chemical formula 14] was used, wherein the transmittance at a wavelength of 420 nm was 25% when the transmittance of the light of a wavelength of 550 nm was 97%, and the transmittance of the light of a wavelength of 460 nm was 92%.

In example 42, the indole compound expressed by the [Chemical formula 12] was used as the selected wavelength absorbing material, and the benzotriazole compound expressed by [Chemical formula 15] was used as the ultraviolet absorber.

[Chemical formula 12]

[Chemical formula 15]

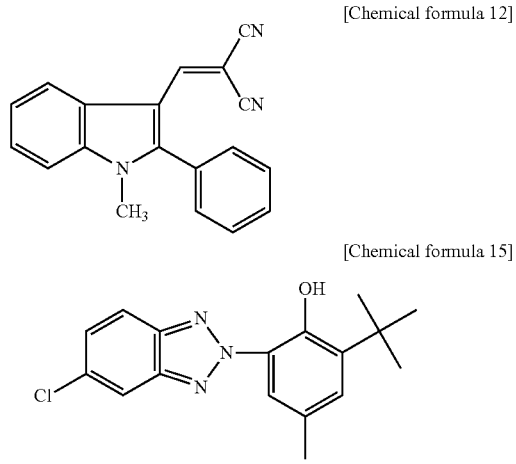

Example 43

The heat ray-shielding resin sheet material of example 44 was obtained similarly to example 24, excluding a point that a diimonium compound which was CIR-RL by Japan Carlit Col, (described as CIR-RL in some cases) was further added to the composition for producing the heat ray-shielding film as an infrared absorbing organic compound, so that the content of the infrared absorbing organic compound in the composition for producing the heat ray-shielding film was 0.05 mass %. Then, the optical performance of the heat ray-shielding resin sheet material of example 44, was measured similarly to example 24. Table 3 shows the measurement result of the optical performance of the heat ray-shielding resin sheet material of example 40.

Comparative Example 4

The heat ray-shielding resin sheet material of comparative example 4 was obtained similarly to example 24, excluding a point that the selected wavelength absorbing material was not added. Then, the optical performance of the heat ray-shielding resin sheet material of comparative example 4, was measured similarly to example 24. Table 3 shows the measurement result of the optical performance of the heat ray-shielding resin sheet material of comparative example 4.

Comparative Example 5

The heat ray-shielding resin sheet material of comparative example 5 was obtained similarly to example 24, excluding a point that the content of the selected wavelength absorbing material was set to 0.005 mass % in the composition for producing the heat ray-shielding film. Then, the optical performance of the heat ray-shielding resin sheet material of comparative example 5, was measured similarly to example 24. Table 3 shows the measurement result of the optical performance of the heat ray-shielding resin sheet material of comparative example 5.

Comparative Example 6

The heat ray-shielding resin sheet material of comparative example 6 was obtained similarly to example 24, excluding a point that a quinophthalone compound (C.I. Solvent Yellow 33, CAS No. 8003-22-3) expressed by [Chemical formula 17] was used as the selected wavelength absorbing material, the quinophthalone compound having a transmission profile in which the transmittance at a wavelength of 420 nm was 55% when the transmittance of a light of a wavelength of 550 nm was 99%, and the transmittance of a light of a wavelength of 460 nm was 90%, and the content of the selected wavelength absorbing material was set to 0.01 mass % in the composition for producing the heat ray-shielding film. Then, the optical performance of the heat ray-shielding resin sheet material of comparative example 6 was measured similarly to example 24. Table 3 shows the measurement result of the optical performance of the heat ray-shielding resin sheet material of comparative example 6.

[Chemical formula 17]

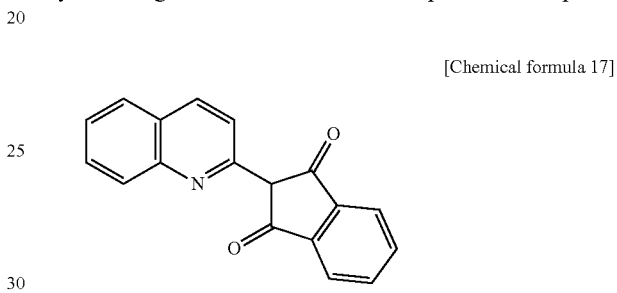

Example 44

Particle b 20 mass %, dispersant a 10 mass %, and toluene 70 mass % were weighed. They were loaded into a paint shaker in which 0.3 mm$\varphi$ZrO$_2$ beads were put, and were subjected to pulverization/dispersion treatment for 10 hours, to thereby obtain a particle dispersion liquid B.

Wherein, a dispersed particle size of the composite tungsten oxide particle in the particle dispersion liquid B was 21 nm when measuring it by a Micro track particle size distribution analyzer manufactured by Nikkiso Co., Ltd.

Dispersant a was further added to the dispersion liquid B, and the liquid was adjusted so that a weight ratio of the dispersant a to the composite tungsten oxide particles [dispersant a/composite tungsten oxide particles]=3. Next, toluene was removed from the composite tungsten oxide particle dispersion liquid using a spray drier, to thereby obtain a composite tungsten oxide particle dispersion powder (abbreviated as dispersion powder B hereafter).

The heat ray-shielding resin sheet material of example 44 was obtained similarly to example 24, excluding a point that the dispersion powder B was used instead of the dispersion powder A. Then, the optical performance of the heat ray-shielding resin sheet material of example 44 was measured similarly to example 24. Table 3 shows this result.

Examples 45 and 46

The heat ray-shielding resin sheet material of examples 45 and 46 was obtained similarly to example 24, excluding a point that the thermoplastic resin was changed to the kind shown in table 3 instead of the polycarbonate resin. Then, the optical performance of the heat ray-shielding resin sheet material of examples 45 and 46 was measured similarly to example 24. Table 3 shows this result. In example 45, acrylic resin (parapet G by KURARAY CO., LTD.) was used as the thermoplastic resin, and a kneading temperature by the twin-screw extruder was set to 270° C. In example 46, polyethylene terephthalate resin (TR-8550T by Teijin Limited) was used, and the kneading temperature by the twin-screw extruder was set to 260° C.

Table 1 shows the transmittance of the light of the wavelength of 420 nm when the transmittance of the lights of the wavelength 550 nm and the wavelength of 460 nm was 90% or more, in the selected wavelength absorbing material itself excluding the absorption of the medium or the base material.

The transmittance of the light of the wavelength of 420 nm through the benzotriazole compound expressed by (Chemical formula 6), (Chemical formula 7), (Chemical formula 8), (Chemical formula 9), and (Chemical formula 10) used in examples 24 to 46, the indole compound expressed by (Chemical formula 12), the azomethine compound expressed by (Chemical formula 13), and the benzophenone compound expressed by (Chemical formula 14), was 40% or less, but the transmittance of the light of the wavelength of 420 nm through the quinophthalone compound expressed by (Chemical formula 17) used in comparative example 6, was higher than 40%.

TABLE 3

| | | Mixture of materials | | | | | |
|---|---|---|---|---|---|---|---|
| | Composite tungsten | Selected wavelength absorbing material | | Ultraviolet absorber | | Infrared absorber | |
| | oxide particle Kind | Kind | Content*1 (Mass %) | Kind | Content*1 (Mass %) | Kind | Content*1 (Mass %) |
| Example 24 | $Cs_{0.33}WO_3$ | Chemical formula 6 | 0.05 | — | — | — | — |
| Example 25 | $Cs_{0.33}WO_3$ | Chemical formula 6 | 0.10 | — | — | — | — |
| Example 26 | $Cs_{0.33}WO_3$ | Chemical formula 6 | 0.02 | — | — | — | — |
| Example 27 | $Cs_{0.33}WO_3$ | Chemical formula 7 | 0.30 | — | — | — | — |
| Example 28 | $Cs_{0.33}WO_3$ | Chemical formula 7 | 0.15 | — | — | — | — |
| Example 29 | $Cs_{0.33}WO_3$ | Chemical formula 7 | 0.05 | — | — | — | — |
| Example 30 | $Cs_{0.33}WO_3$ | Chemical formula 8 | 0.35 | — | — | — | — |
| Example 31 | $Cs_{0.33}WO_3$ | Chemical formula 8 | 0.15 | — | — | — | — |
| Example 32 | $Cs_{0.33}WO_3$ | Chemical formula 8 | 0.05 | — | — | — | — |
| Example 33 | $Cs_{0.33}WO_3$ | Chemical formula 9 | 0.15 | — | — | — | — |
| Example 34 | $Cs_{0.33}WO_3$ | Chemical formula 10 | 0.15 | — | — | — | — |
| Example 35 | $Cs_{0.33}WO_3$ | Chemical formula 12 | 0.05 | — | — | — | — |
| Example 36 | $Cs_{0.33}WO_3$ | Chemical formula 12 | 0.1 | — | — | — | — |
| Example 37 | $Cs_{0.33}WO_3$ | Chemical formula 12 | 0.02 | — | — | — | — |
| Example 38 | $Cs_{0.33}WO_3$ | Chemical formula 13 | 0.05 | — | — | — | — |
| Example 39 | $Cs_{0.33}WO_3$ | Chemical formula 14 | 1.8 | — | — | — | — |
| Example 40 | $Cs_{0.33}WO_3$ | Chemical formula 6 | 0.05 | Chemical formula 15 | 0.3 | — | — |
| Example 41 | $Cs_{0.33}WO_3$ | Chemical formula 6 | 0.05 | Chemical formula 16 | 1.0 | — | — |
| Example 42 | $Cs_{0.33}WO_3$ | Chemical formula 12 | 0.05 | Chemical formula 15 | 0.3 | — | — |
| Example 43 | $Cs_{0.33}WO_3$ | Chemical formula 6 | 0.05 | — | — | CIR-RL | 0.05 |
| Example 44 | $Rb_{0.33}WO_3$ | Chemical formula 6 | 0.05 | — | — | — | — |
| Example 45 | $Cs_{0.33}WO_3$ | Chemical formula 6 | 0.05 | — | — | — | — |
| Example 46 | $Cs_{0.33}WO_3$ | Chemical formula 6 | 0.05 | — | — | — | — |
| Comparative example 4 | $Cs_{0.33}WO_3$ | — | — | — | — | — | — |
| Comparative example 5 | $Cs_{0.33}WO_3$ | Chemical formula 6 | 0.005 | — | — | — | — |
| Comparative example 6 | $Cs_{0.33}WO_3$ | Chemical formula 17 | 0.01 | — | — | — | — |

| | Thermoplastic resin | Initial property | | |
|---|---|---|---|---|
| | | Visible light transmittance (%) | Solar transmittance (%) | Yellowness index (YI) |
| Example 24 | Polycarbonate | 70.1 | 29.5 | 4.7 |
| Example 25 | Polycarbonate | 70.2 | 28.9 | 8.4 |
| Example 26 | Polycarbonate | 70.2 | 30.2 | 1.0 |
| Example 27 | Polycarbonate | 70.1 | 29.1 | 7.3 |
| Example 28 | Polycarbonate | 70.3 | 30.0 | 3.2 |
| Example 29 | Polycarbonate | 70.0 | 31.0 | 0.5 |
| Example 30 | Polycarbonate | 70.1 | 28.9 | 9.4 |
| Example 31 | Polycarbonate | 70.4 | 30.3 | 4.5 |
| Example 32 | Polycarbonate | 70.0 | 31.3 | −0.5 |
| Example 33 | Polycarbonate | 70.2 | 30.4 | 3.3 |
| Example 34 | Polycarbonate | 70.5 | 30.6 | 4.7 |
| Example 35 | Polycarbonate | 70.2 | 29.9 | 4.5 |
| Example 36 | Polycarbonate | 70.0 | 28.7 | 9.5 |
| Example 37 | Polycarbonate | 70.5 | 30.2 | 1.5 |
| Example 38 | Polycarbonate | 70.5 | 28.8 | 3.8 |
| Example 39 | Polycarbonate | 70.1 | 30.8 | 4.4 |
| Example 40 | Polycarbonate | 70.3 | 29.1 | 6.4 |
| Example 41 | Polycarbonate | 70.3 | 28.8 | 8.2 |
| Example 42 | Polycarbonate | 70.1 | 29.5 | 7.1 |
| Example 43 | Polycarbonate | 70.3 | 27.6 | 9.5 |

TABLE 3-continued

| | | | | | |
|---|---|---|---|---|---|
| Example 44 | Polycarbonate | 70.1 | 30.9 | 4.1 |
| Example 45 | Acryl | 70.2 | 29.8 | 3.9 |
| Example 46 | Polyethylene terephthalate | 70.4 | 29.4 | 5 |
| Comparative example 4 | Polycarbonate | 70.3 | 33.3 | −4.2 |
| Comparative example 5 | Polycarbonate | 70.4 | 33.0 | −3.5 |
| Comparative example 6 | Polycarbonate | 70.3 | 30.1 | 54.1 |

Content*1: content in heat ray-shielding film, resin sheet material

Evaluation of Examples 24 to 46, and Comparative Examples 4 to 6

In examples 24 to 46, a lower solar transmittance than comparative example 4 could be obtained by providing a coexistence state of the selective wavelength absorbing material and the composite tungsten oxide particles at a suitable ratio, wherein the selective wavelength absorbing material didn't coexist in comparative example 4. Further, YI of the heat ray-shielding laminated transparent sheet material didn't exceed 10, and there was little change of the color tone due to coexistence of the selective wavelength absorbing material. Especially in examples 40 to 42, further lower solar transmittance could be obtained than the coexistence state of the selected wavelength absorbing material only and the composite tungsten oxide particles, by further allowing the ultraviolet absorber to coexist. Also, in example 43, by providing a coexistence state of the infrared absorbing organic compound that absorbs the light of a wavelength of about 800 to 1100 nm which was not sufficiently absorbed by the composite tungsten oxide particles and the selected wavelength absorbing material, further lower solar transmittance than the coexistence state of the selected wavelength absorbing material only and the composite tungsten oxide particles, could be obtained.

On the other hand, in comparative example 5, a sufficient absorption could not be obtained because the addition amount of the selected wavelength absorbing material was small, and only the same degree of solar transmittance as comparative example 4 could be obtained, wherein the selective wavelength absorbing material didn't coexist in comparative example 4. In comparative example 6, the quinophthalone compound having weak absorption at wavelength of 420 nm was used, with respect to the transmittance of the lights of the wavelength of 550 nm and the wavelength of 460 nm, as the selected wavelength absorbing material, and therefore YI was raised to 10 or more, resulting in a great change of the color tone of the heat ray-shielding resin sheet material.

The invention claimed is:

1. A heat ray-shielding film containing a composite tungsten oxide particle having a hexagonal crystal structure, a selected wavelength absorbing material, and a thermoplastic resin,
wherein the composite tungsten oxide is expressed by a general formula $M_yWO_z$ wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$,
wherein the selected wavelength absorbing material is a benzotriazole compound expressed by [Chemical Formula 6] and has a transmission profile in which a transmittance of a light of a wavelength of 420 nm is set to 40% or less when a transmittance of a light of wavelengths of 460 nm and 550 nm is 90% or more,

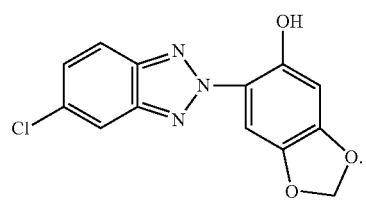

[Chemical formula 6]

2. The heat ray-shielding film according to claim 1, wherein a content of the selected wavelength absorbing material in the heat ray-shielding film is 0.01 mass % or more and 2.0 mass % or less.

3. The heat ray-shielding film according to claim 1, wherein the thermoplastic resin is one kind of resin selected from the resin group consisting of polyvinyl acetal resin, vinyl chloride resin, ethylene-vinyl acetate copolymer, or a mixture of two or more kinds of resins selected from the above resin group, or a copolymer of two or more kinds of resins selected from the above resin group.

4. The heat ray-shielding film according to claim 1, wherein the thermoplastic resin is polyvinyl butyral resin, and further contains a plasticizer.

5. The heat ray-shielding film according to claim 1, wherein the composite tungsten oxide particle is at least one kind selected from $Cs_{0.33}W_3$ and $Rb_{0.33}WO_3$.

6. The heat ray-shielding film according to claim 1, wherein the composite tungsten oxide particle is a particle having a dispersed particle size of 40 nm or less.

7. The heat ray-shielding film according to claim 1, wherein the heat ray-shielding film further contains an ultraviolet absorber.

8. The heat ray-shielding film according to claim 7, wherein the ultraviolet absorber is one or more kinds selected from a benzotriazole compound and a benzophenone compound.

9. The heat ray-shielding film according to claim 7, wherein a content of the ultraviolet absorber in the heat ray-shielding film is 0.02 mass % or more and 5.0 mass % or less.

10. The heat ray-shielding film according to claim 1, wherein the heat ray-shielding film further contains polyvalent metal salt.

11. The heat ray-shielding film according to claim 10, wherein the polyvalent metal salt is bis (2-ethylbutyrate) magnesium.

* * * * *